United States Patent
Pugsley et al.

(10) Patent No.: US 10,678,692 B2
(45) Date of Patent: Jun. 9, 2020

(54) METHOD AND SYSTEM FOR COORDINATING BASELINE AND SECONDARY PREFETCHERS

(71) Applicant: INTEL CORPORATION, Santa Clara, CA (US)

(72) Inventors: Seth H. Pugsley, Hillsboro, OR (US); Manjunath Shevgoor, San Jose, CA (US); Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 15/709,285

(22) Filed: Sep. 19, 2017

(65) Prior Publication Data
US 2019/0087341 A1   Mar. 21, 2019

(51) Int. Cl.
*G06F 12/0862* (2016.01)
*G06F 9/30* (2018.01)
*G06F 12/0811* (2016.01)
*G06F 12/0806* (2016.01)
*G06F 12/0897* (2016.01)

(52) U.S. Cl.
CPC ...... *G06F 12/0862* (2013.01); *G06F 9/30047* (2013.01); *G06F 12/0806* (2013.01); *G06F 12/0811* (2013.01); *G06F 12/0897* (2013.01); *G06F 2212/283* (2013.01); *G06F 2212/602* (2013.01); *G06F 2212/6028* (2013.01)

(58) Field of Classification Search
CPC ............ G06F 12/0862; G06F 12/0811; G06F 9/30047; G06F 2212/602; G06F 2212/283
See application file for complete search history.

(56) References Cited

U.S. PATENT DOCUMENTS

| 8,706,969 | B2* | 4/2014 | Anderson | G06F 12/0862 711/122 |
|---|---|---|---|---|
| 2011/0113199 | A1* | 5/2011 | Tang | G06F 12/0862 711/130 |
| 2014/0129780 | A1* | 5/2014 | Bade | G06F 12/0862 711/137 |
| 2014/0149668 | A1* | 5/2014 | Chaudhary | G06F 12/0862 711/119 |

(Continued)

OTHER PUBLICATIONS

Jakowski et al., U.S. Appl. No. 15/447,037 entitled "Method and Apparatus for Erase Block Granularity Eviction in Host Based Caching", Apr. 1, 2017; 55 pages.

(Continued)

*Primary Examiner* — Tasnima Matin
(74) *Attorney, Agent, or Firm* — Alliance IP, LLC

(57) ABSTRACT

In one embodiment, a processor comprises a first prefetcher to generate prefetch requests to prefetch data into a mid-level cache; a second prefetcher to generate prefetch requests to prefetch data into the mid-level cache; and a prefetcher selector to select a prefetcher configuration for the first prefetcher and the second prefetcher based on at least one memory access metric, wherein the prefetcher configuration is to specify whether the first prefetcher is to be enabled to issue, to the mid-level cache, prefetch requests for data of a particular page and whether the second prefetcher is to be enabled to issue, to the mid-level cache, prefetch requests for data of the particular page.

19 Claims, 14 Drawing Sheets

(56) References Cited

U.S. PATENT DOCUMENTS

2014/0297965 A1* 10/2014 Jayaseelan .......... G06F 12/0862
711/137

OTHER PUBLICATIONS

Korgaonkar et al., U.S. Appl. No. 15/475,197 entitled "Method and Apparatus for Reducing Write Congestion in Non-Volatile Memory Based Last Level Caches", filed Mar. 31, 2017; 70 pages.
Kumar et al., U.S. Appl. No. 15/476,126 entitled "Method and Apparatus for Persistently Caching Storage Data in a Page Cache", filed Mar. 31, 2017; 53 pages.
Shevgoor, M. et al., "Efficiently Prefetching Complex Address Patterns", http://dx.doi.org/10.1145/2830772.2830793, MICRO-48, Dec. 5-9, 2015, Waikiki, HI, USA, 12 pages.

* cited by examiner

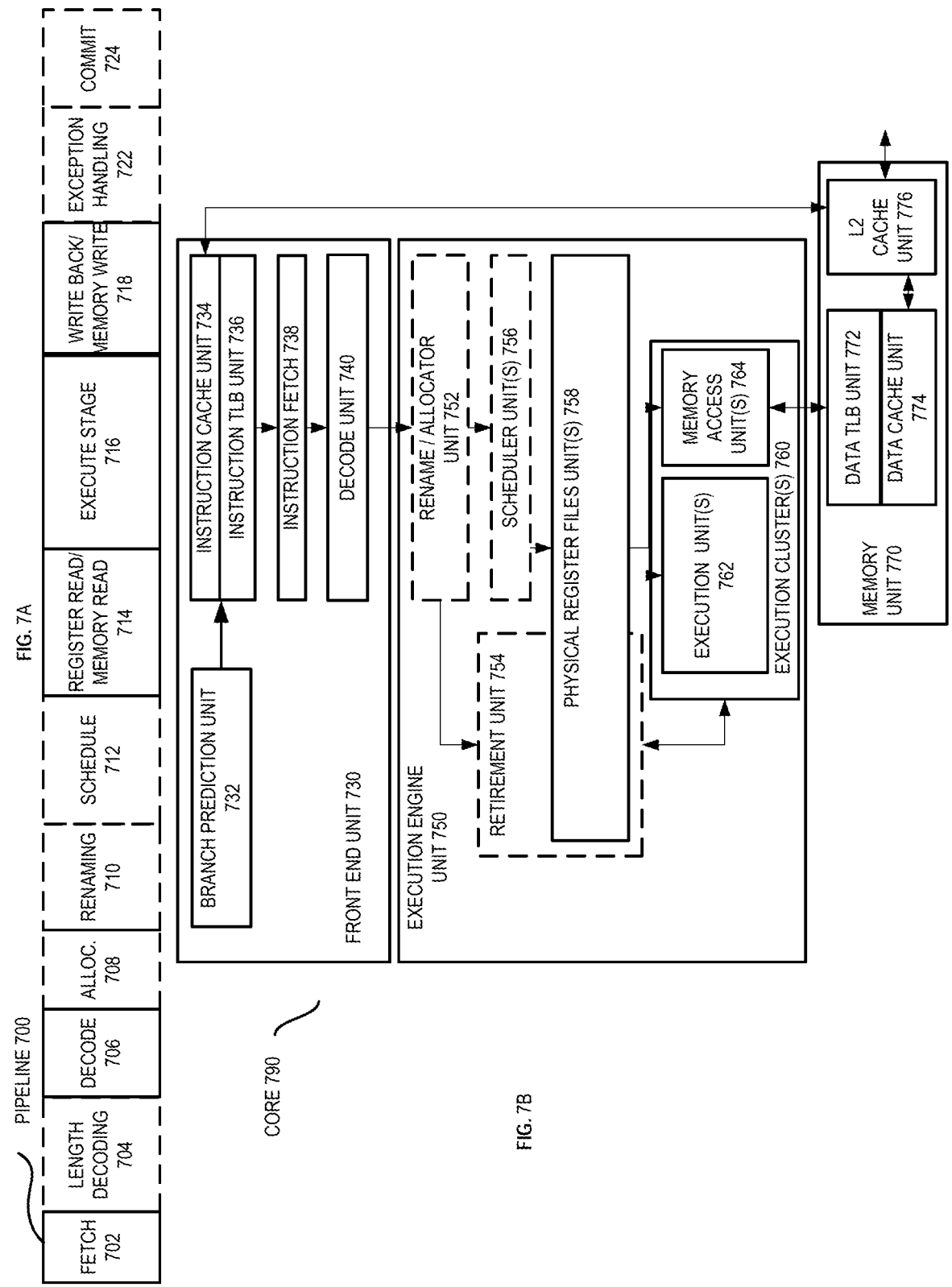

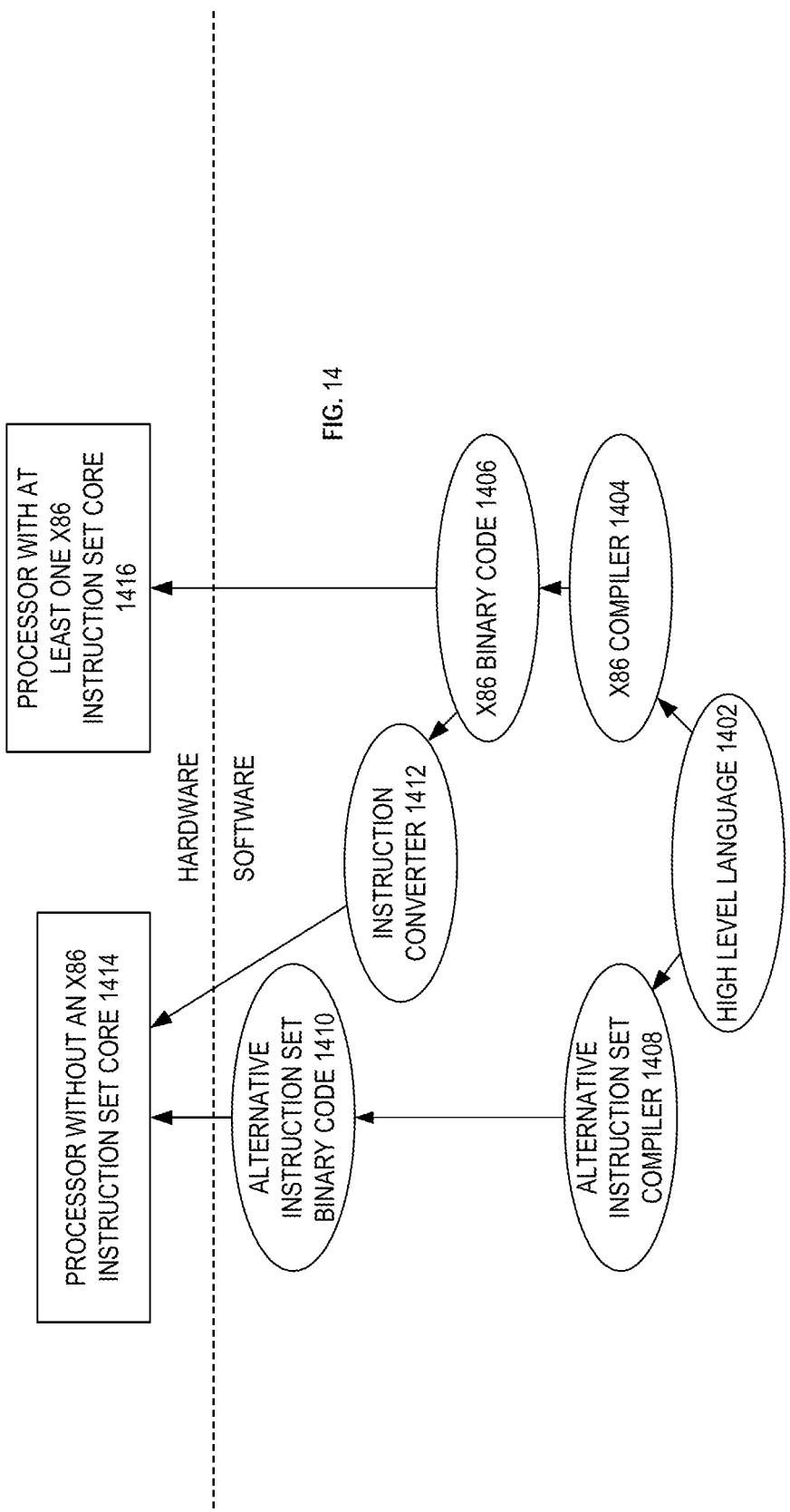

METHOD AND SYSTEM FOR COORDINATING BASELINE AND SECONDARY PREFETCHERS

FIELD

The present disclosure relates in general to the field of computer development, and more specifically, to data prefetching.

BACKGROUND

A computing system may include one or more processors, one or more memory devices, one or more input/output (I/O) controllers, one or more I/O devices, one or more caches, one or more cache agents, and/or other components. A computing system may prefetch data to enhance operation of the computing system.

BRIEF DESCRIPTION OF THE DRAWINGS

FIG. 7A is a block diagram illustrating both an exemplary in-order pipeline and an exemplary register renaming, out-of-order issue/execution pipeline in accordance with certain embodiments;

FIG. 7B is a block diagram illustrating both an exemplary embodiment of an in-order architecture core and an exemplary register renaming, out-of-order issue/execution architecture core to be included in a processor in accordance with certain embodiments;

FIG. 14 is a block diagram contrasting the use of a software instruction converter to convert binary instructions in a source instruction set to binary instructions in a target instruction set in accordance with certain embodiments.

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
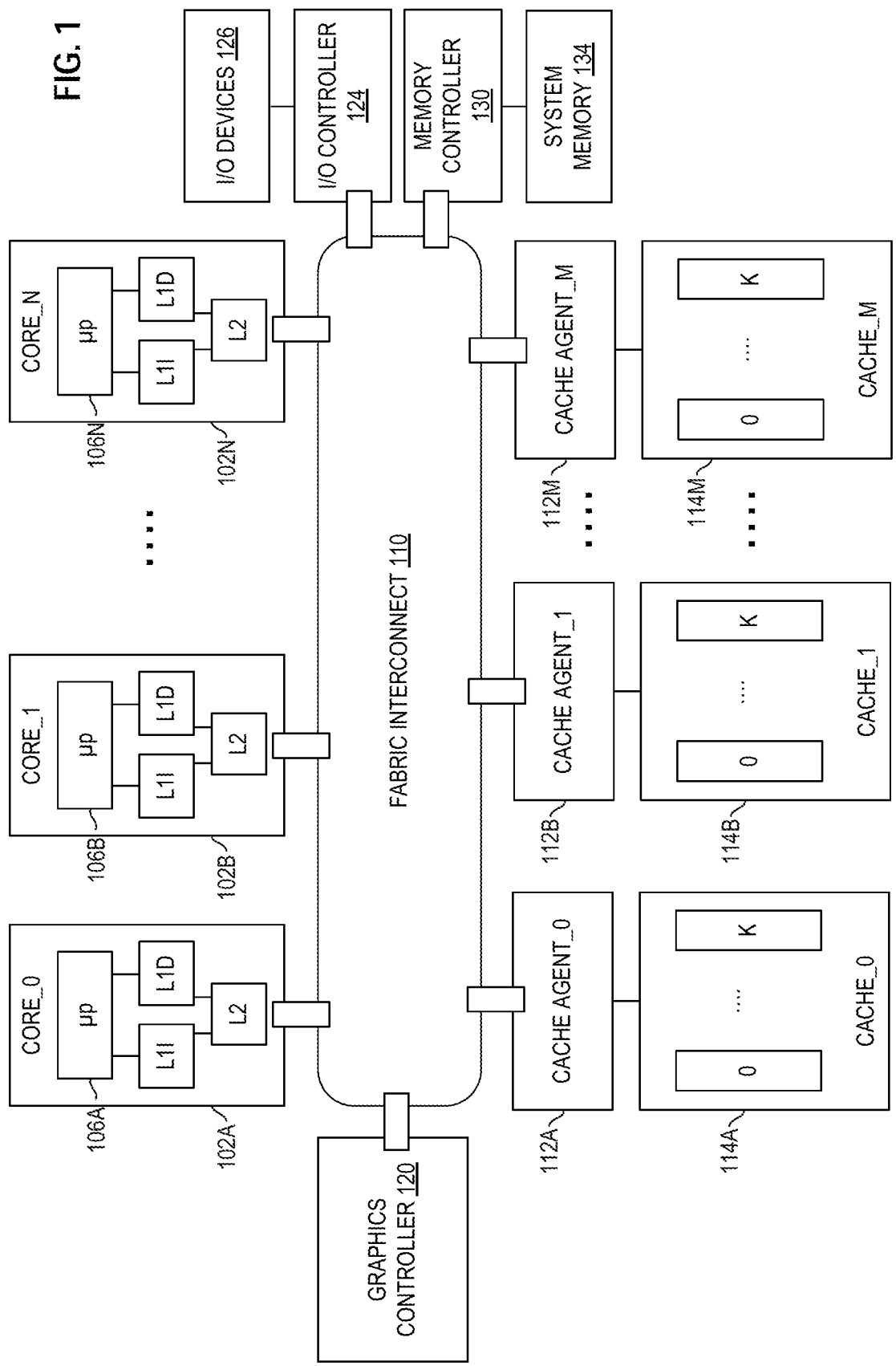
FIG. 1 is a block diagram of a processor with a plurality of cache agents and caches in accordance with certain embodiments.

FIG. 1 is a block diagram of a processor 100 with a plurality of cache agents 112 (i.e., cache agents 112A-112M) and caches 114 (i.e., caches 114A-114M) in accordance with certain embodiments. In a particular embodiment, processor 100 may be a single integrated circuit, though it is not limited thereto. The processor 100 may be part of a system on a chip in various embodiments. The processor 100 may include, for example, one or more cores 102A, 102B ... 102N. In a particular embodiment, the cores may each include a corresponding microprocessor 106A, 106B, or 106N, level one instruction (L1I) cache, level one data cache (L1D), and level two (L2) cache. The processor 100 may further include one or more cache agents 112A, 112B, ... 112M (any of these cache agents may be referred to herein as cache agent 112), and corresponding caches 114A, 114B, ... 114M (any of these caches may be referred to as cache 114). In a particular embodiment, a cache 114 is a last level cache (LLC) slice. An LLC may be made up of any suitable number of LLC slices. Each cache may include one or more banks of memory to store data that corresponds to (e.g., duplicates) data stored in system memory 134. The processor 100 may further include a fabric interconnect 110 comprising a communications bus (e.g., a ring or mesh network) through which the various components of the processor 100 connect. In one embodiment, the processor 100 further includes a graphics controller 120, an I/O controller 124, and a memory controller 130. The I/O controller 124 may couple various I/O devices 126 to components of the processor through the fabric interconnect 110. Memory controller 130 manages memory transactions to and from system memory 134.

Figure 2:
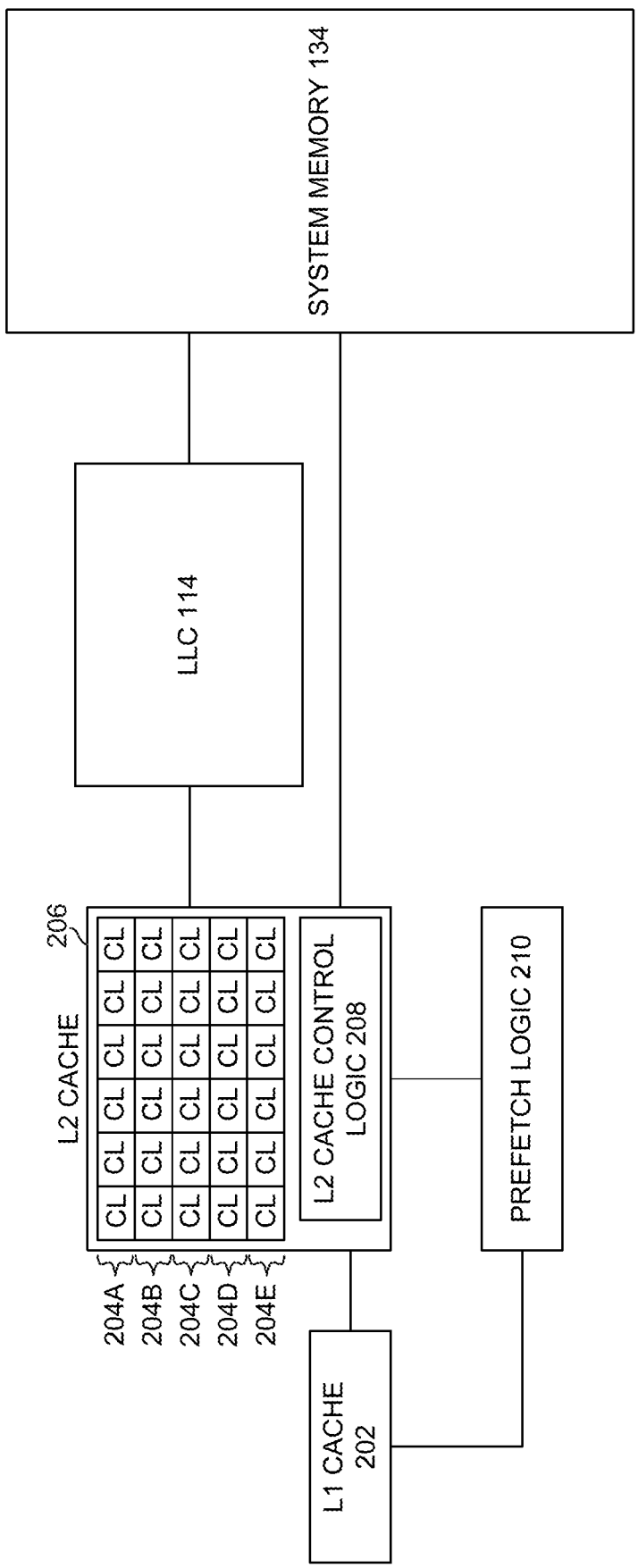
FIG. 2 is a block diagram of various memory blocks and prefetch logic in accordance with certain embodiments.

As shown in FIG. 2, processor 100 may include prefetch logic 210 operable to monitor misses in an L1 cache (e.g., an L1 instruction cache and/or an L1 data cache). An L1 cache miss may occur when a microprocessor 106 tries to access (e.g., via a read or write operation) data or an instruction that is not stored in the corresponding L1 cache. Upon an L1 cache miss, the L1 cache may request the data from an L2 cache. If the data is not found in the L2 cache, then the L2 cache may request the data from another mid-level cache or an LLC 114. If the data is not found in the LLC 114, then the LLC 114 will request the data from system memory 134. If the data is not found in system memory 134, then the data may be requested from a storage device (e.g., I/O 126). A substantial amount of time may be required to move the data to the L1 cache if the data is not stored in a cache that is close to the L1 cache (e.g., if the data is not stored in the L2 cache). Such delay may result in significantly slower program execution.

In various embodiments of the present disclosure, prefetch logic 210 analyzes L1 cache misses (e.g., by monitoring requests from an L1 cache to an L2 cache) and implements prefetching based at least in part on the requests. Prefetching may include requesting an instruction or data block from a lower level cache (e.g., a mid-level cache or the LLC 114) or system memory 134 before the instruction or data block is actually needed (e.g., before the instruction or data block is requested by the L1 cache). The prefetched data may be stored in an L2 cache such that it is available when an L1 cache requests the data. Prefetching may speed up the execution of a program by reducing the amount of time consumed waiting for an instruction or data during program execution. In various embodiments, prefetch logic 210 may observe requests to an L2 cache and if it notices a pattern in the requests, the prefetch logic 210 may determine that a particular cache line is likely to be requested and may send a request to the LLC or other memory block to bring the cache line into the L2 cache.

In various embodiments of the present disclosure, prefetch logic 210 may include a baseline prefetcher and a secondary prefetcher. Each prefetcher may analyze L1 cache misses and generate prefetch decisions (i.e., determinations of which data should be prefetched). Naively adding a prefetcher and letting it run simultaneously with an existing prefetcher is likely to lead to excessive prefetches being issued, which may harm performance in bandwidth-constrained situations. Accordingly, in various embodiments of the present disclosure, the prefetch logic may selectively enable and disable the baseline prefetcher and the secondary prefetcher in response to program behavior in order to determine which prefetch requests are sent to the mid-level cache.

Other solutions to controlling mid-level cache (MLC) prefetcher behavior may focus around prefetch accuracy or coverage of a single prefetcher, with only the ability to change the behavior of that single prefetcher or disable the prefetcher. Various embodiments of the present disclosure coordinate a baseline MLC prefetcher with a secondary MLC prefetcher, providing more dimensions for tuning relative to a single prefetcher in isolation.

In various embodiments, if general spatial locality is low and coverage by the secondary prefetcher is low, then all MLC prefetching is disabled (i.e., both the baseline prefetcher and the secondary prefetcher are disabled). In some embodiments, if general spatial locality is low, but secondary prefetcher coverage is at least moderate, then the secondary prefetcher is enabled, and the baseline prefetcher is disabled. In some embodiments, if general spatial locality is high, then the secondary prefetcher is disabled and the baseline prefetcher is enabled. In various embodiments, general spatial locality and secondary prefetcher coverage are tracked on both a per-page basis and a global basis and are used to determine the prefetcher configuration on a page-by-page basis.

Thus, in various embodiments, an adaptive mechanism may be used to select between two mid-level cache prefetchers to harness the relative strength of each prefetcher. In a particular embodiment, the secondary prefetcher may be used when spatial locality is moderate (and perhaps there are complex patterns), the baseline prefetcher 302 may be used when spatial locality is very high, and MLC prefetching may be completely disabled when spatial locality is very low and patterns are unpredictable.

In various embodiments, provision of a secondary prefetcher and logic to intelligently select whether to use the secondary prefetcher or the baseline prefetcher may improve the average number of instructions executed per cycle, reduce memory bandwidth, and/or reduce energy consumed.

The processor 100 may be any type of processor, including a general purpose microprocessor, special purpose processor, microcontroller, coprocessor, graphics processor, accelerator, field programmable gate array (FPGA), or other type of processor (e.g., any processor described herein). The processor 100 may include multiple threads and multiple execution cores, in any combination. In one embodiment, the processor 100 is integrated in a single integrated circuit die having multiple hardware functional units (hereafter referred to as a multi-core system). The multi-core system may be a multi-core processor package, but may include other types of functional units in addition to processor cores. Functional hardware units may include processor cores, digital signal processors (DSP), image signal processors (ISP), graphics cores (also referred to as graphics units), voltage regulator (VR) phases, input/output (I/O) interfaces (e.g., serial links, DDR memory channels) and associated controllers, network controllers, fabric controllers, or any combination thereof.

System memory 134 stores instructions and/or data that are to be interpreted, executed, and/or otherwise used by the cores 102A, 102B . . . 102N. The cores may be coupled towards the system memory 134 via the fabric interconnect 110. In some embodiments, the system memory 134 has a dual-inline memory module (DIMM) form factor or other suitable form factor.

The system memory 134 may include any type of volatile and/or non-volatile memory. Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, phase change memory, Spin Hall Effect Magnetic RAM (SHE-MRAM), Spin Transfer Torque Magnetic RAM (STTRAM), or other non-volatile memory devices.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory array is synchronous dynamic random access memory (SDRAM). In some embodiments, any portion of system memory 134 that is volatile memory can comply with JEDEC standards including but not limited to Double Data Rate (DDR) standards, e.g., DDR3, 4, and 5, or Low Power DDR4 (LPDDR4) as well as emerging standards.

A cache (e.g., cache 114, an L1 cache, an L2 cache, or other cache described herein) may include any type of volatile or non-volatile memory, including any of those listed above. Processor 100 is shown as having a multi-level cache architecture. In one embodiment, the cache architecture includes an on-die or on-package L1 and L2 cache and an on-die or on-chip LLC (though in other embodiments the LLC may be off-die or off-chip) which may be shared among the cores 102A, 102B, . . . 102N, where requests from the cores are routed through the fabric interconnect 110 to a particular LLC slice (i.e., a particular cache 114) based on request address. Any number of cache configurations and cache sizes are contemplated. Depending on the architecture, the cache may be a single internal cache located on an integrated circuit or may be multiple levels of internal caches on the integrated circuit. Other embodiments include a combination of both internal and external caches depending on particular embodiments.

In other embodiments, the cache architecture may include additional levels of cache, such as L3, L4, and so on. Any cache (e.g., an L2, L3, L4, or other cache) that is located between an L1 cache and an LLC may be referred to herein as a mid-level cache. When a request misses in the L1 cache, the request may be sent to one or more mid-level caches. If the request misses in these caches, it may then be sent to the LLC 114.

Although this disclosure largely focuses on the interaction of an L2 cache with an LLC, the teachings associated with the L2 cache and prefetch logic may be applied to any mid-level cache. Thus, in a particular embodiment, prefetch logic 210 may monitor L2 misses and selectively enable a baseline prefetcher and a secondary prefetcher to prefetch data into an L3 cache.

During operation, a core 102A, 102B, . . . or 102N may send a memory request (e.g., read request or write request), via an L1 cache, to an L2 cache (and/or other mid-level cache positioned before the LLC). In various embodiments, a cache agent 112 may intercept a read request from an L1 cache (e.g., when data or an instruction to be used by a core is not found in the corresponding L1 cache, an L1 miss is considered to have occurred, and the L1 cache may subsequently send a request for the data or instruction to an L2 cache). If the read request hits the L2 cache, the L2 cache returns the data in the cache line that, e.g., matches a tag lookup. If the read request misses the L2 cache, then the read request is forwarded to the LLC (or the next mid-level cache and eventually to the LLC if the read request misses the mid-level cache(s)). If the read request misses in the LLC, the data is retrieved from system memory 134. In various embodiments, the cache agent 112 may intercept a write request from an L1 cache. If the write request hits the L2 cache after a tag lookup, then the cache agent 112 may perform an in-place write of the data in the cache line. If there is a miss, the cache agent 112 may create a read request to the LLC to bring the data in to the L2 cache. If there is a miss in the LLC, the data is retrieved from system memory 134. Various embodiments contemplate any number of caches and any suitable caching implementations. In various embodiments, the cache agents (or a subset thereof) may each include a separate instance of prefetch logic 210. In other embodiments, one or more instances of prefetch logic 210 may be located on processor 100 independent of a cache agent.

A cache agent 112 may be associated with one or more processing elements (e.g., cores 102) and may process memory requests from these processing elements. In various embodiments, a cache agent 112 may also manage coherency between all of its associated processing elements. For example, a cache agent 112 may initiate transactions into coherent memory and may retain copies of data in its own cache structure. A cache agent 112 may also provide copies of coherent memory contents to other cache agents.

In various embodiments, a cache agent 112 may receive a memory request and route the request towards an entity that facilitates performance of the request. For example, if cache agent 112 of a processor receives a memory request specifying a memory address of a memory device (e.g., system memory 134) coupled to the processor, the cache agent 112 may route the request to a memory controller 130 that manages the particular memory device (e.g., in response to a determination that the data is not cached at processor 100). As another example, if the memory request specifies a memory address of a memory device that is on a different processor (but on the same computing node), the cache agent 112 may route the request to an inter-processor communication controller which communicates with the other processors of the node. As yet another example, if the memory request specifies a memory address of a memory device that is located on a different computing node, the cache agent 112 may route the request to a fabric controller (which communicates with other computing nodes via a network fabric such as an Ethernet fabric, an Intel Omni-Path Fabric, an Intel True Scale Fabric, an InfiniBand-based fabric (e.g., Infiniband Enhanced Data Rate fabric), a RapidIO fabric, or other suitable board-to-board or chassis-to-chassis interconnect).

In particular embodiments, the cache agent 112 may include a system address decoder that maps virtual memory addresses and/or physical memory addresses to entities associated with the memory addresses. For example, for a particular memory address (or region of addresses), the system address decoder may include an indication of the entity (e.g., memory device) that stores data at the particular address or an intermediate entity on the path to the entity that stores the data (e.g., a computing node, a processor, a memory controller, an inter-processor communication controller, a fabric controller, or other entity). When a cache agent 112 processes a memory request, it may consult the system address decoder to determine where to send the memory request.

In particular embodiments, a cache agent 112 may be a combined caching agent and home agent, referred to herein in as a caching home agent (CHA). A caching agent may include a cache pipeline and/or other logic that is associated with a corresponding portion of a cache memory, such as a distributed portion (e.g., 114) of a last level cache. Each individual cache agent 112 may interact with a corresponding LLC slice (e.g., cache 114). For example, cache agent 112A interacts with cache 114A, cache agent 112B interacts with cache 114B, and so on. A home agent may include a home agent pipeline and may be configured to protect a given portion of a memory such as a system memory 134 coupled to the processor. To enable communications with such memory, CHAs may be coupled to memory controller 130.

In general, a CHA may serve (via a caching agent) as the local coherence and cache controller and also serve (via a home agent) as a global coherence and memory controller interface. In an embodiment, the CHAs may be part of a distributed design, wherein each of a plurality of distributed CHAs are each associated with one of the cores 102. Although in particular embodiments a cache agent 112 may comprise a cache controller and a home agent, in other embodiments, a cache agent 112 may comprise a cache controller but not a home agent.

I/O controller 124 may include logic for communicating data between processor 100 and I/O devices 126, which may refer to any suitable devices capable of transferring data to and/or receiving data from an electronic system, such as processor 100. For example, an I/O device may be a network fabric controller; an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An I/O device 126 may communicate with I/O controller 124 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various embodiments, I/O devices 126 coupled to the I/O controller 124 may be located off-chip (i.e., not on the same integrated circuit or die as a processor) or may be integrated on the same integrated circuit or die as a processor.

Memory controller 130 is an integrated memory controller (i.e., it is integrated on the same die or integrated circuit as one or more cores 102 of the processor 100) that includes logic to control the flow of data going to and from system memory 134. Memory controller 130 may include logic operable to read from a system memory 134, write to a system memory 134, or to request other operations from a system memory 134. In various embodiments, memory controller 130 may receive write requests originating from cores 102 or I/O controller 124 and may provide data specified in these requests to a system memory 134 for storage therein. Memory controller 130 may also read data from system memory 134 and provide the read data to I/O controller 124 or a core 102. During operation, memory controller 130 may issue commands including one or more addresses (e.g., row and/or column addresses) of the system memory 134 in order to read data from or write data to memory (or to perform other operations). In some embodiments, memory controller 130 may be implemented in a different die or integrated circuit than that of cores 102.

Although not depicted, a computing system including processor 100 may include and/or use a battery, renewable energy converter (e.g., solar power or motion-based energy), and/or power supply outlet connector and associated system to receive power, a display to output data provided by processor 100, and/or a network interface allowing the processor 100 to communicate over a network. In various embodiments, the battery, power supply outlet connector, display, and/or network interface may be communicatively coupled to processor 100.

FIG. 2 is a block diagram of various memory blocks and prefetch logic 210 in accordance with certain embodiments. The memory blocks include an L1 cache 202 (which may represent a cache that stores instructions and/or data), an L2 cache 206, an LLC 114, and system memory 134. Each cache may store a plurality of cache lines. For example, in the embodiment depicted, L2 cache 206 stores a plurality of sets (e.g., set 204A, set 204B, etc.) of cache lines (CL). The L1 cache 202 and LLC 114 may similarly store a plurality of sets of cache lines. Each cache line may comprise any suitable amount of data. For example, in a particular embodiment, a cache line includes 64 bytes of data.

In various embodiments, when a miss occurs in the L1 cache 202, the L1 cache requests the data from the L2 cache 206. The prefetch logic 210 may also receive this request (or may otherwise receive an indication of the requested data that was not found in the L1 cache). The L2 cache control logic 208 receives this request and determines whether the requested data (e.g., cache line) is located in the L2 cache 206. If it is, the cache control logic 208 reads the data and returns the data to the L1 cache 202. If it is not, the cache control logic may request the data from the LLC 114 (which may in turn request the data from the system memory 134 if the LLC 114 does not include the requested data). L2 cache control logic 208 may also receive prefetch requests from prefetch logic 210 and determine whether data specified by the prefetch requests is located within the L2 cache. If the data is not located in the L2 cache 206, the L2 cache control logic 208 may request the data from the LLC 114 (which in turn may request the data from the system memory 134 if the LLC 114 does not include the data).

In various embodiments, any of the depicted memory blocks may be coupled to any one or more of the other memory blocks in any suitable manner. As an example, the connectivity between the blocks may vary depending on whether the LLC 114 is inclusive or exclusive. LLC 114 may be classified as inclusive or exclusive based on its inclusion relation with mid-level caches (e.g., L2 cache 206).

An inclusive LLC may duplicate every line in the mid-level cache(s) within the LLC. This helps simplify coherence flows, although duplication comes at an overall reduced capacity. Writes in an inclusive LLC occur 1) when filling from system memory 134 on an LLC miss and 2) for dirty victims (i.e., modified cache lines that are evicted) from the L2 cache (or other mid-level cache coupled to the LLC). In an inclusive LLC architecture, the eviction of clean cache lines from the L2 cache do not generate writes in the LLC (as these cache lines have already been written to the LLC at the time of filling from the system memory). In an inclusive LLC architecture, an LLC miss may result in a write from system memory 134 to the L2 cache 206 and a write from system memory 134 to the LLC 114. An LLC hit may result in a write from the LLC 114 to the L2 cache 206.

In exclusive LLCs, both clean and dirty L2 cache (or other mid-level cache) victims are written to the LLC, while memory fills (in response to LLC misses) only occur in the L2 cache. An LLC miss may result in a write from system memory 134 to the L2 cache 206. An LLC hit may result in a write from the LLC 114 to the L2 cache 206. A clean victim in the L2 cache 206 may result in a write of the evicted cache line into the LLC 114 and a dirty victim in the L2 cache 206 may result in a write of the evicted cache line into the LLC 114.

Prefetch logic 210 is operable to monitor L1 cache misses and generate prefetch requests based on memory access patterns indicated by the L1 cache misses. That is, the prefetch logic 210 is able to access information describing which cache lines were requested by the L1 cache and determine which data should be prefetched based on the requested cache lines. The prefetch logic 210 may initiate a prefetch operation by determining that a particular cache line (or multiple cache lines) should be prefetched and issuing a prefetch request to the L2 cache (e.g., by placing an identifier of the cache line(s) in a prefetch queue or by otherwise making the prefetch request accessible to the L2 cache). The L2 cache control logic 208 may access the prefetch queue and insert the identifier of the cache line(s) into a L2 fetch queue of the L2 cache 206 if the L2 cache 206 does not already include the cache line(s) (if the L2 cache 206 already includes the cache line(s) they do not need to be prefetched). The L2 fetch queue may also include requests for data resulting from L1 cache misses (e.g., the requests may include identifiers of cache lines that are to be fetched). In various embodiments, L2 cache control logic 208 may give priority to requests for data resulting from L1 cache misses over prefetch requests, so as to reduce the amount of time a microprocessor 106 has to wait for data requested by the microprocessor.

Figure 3:
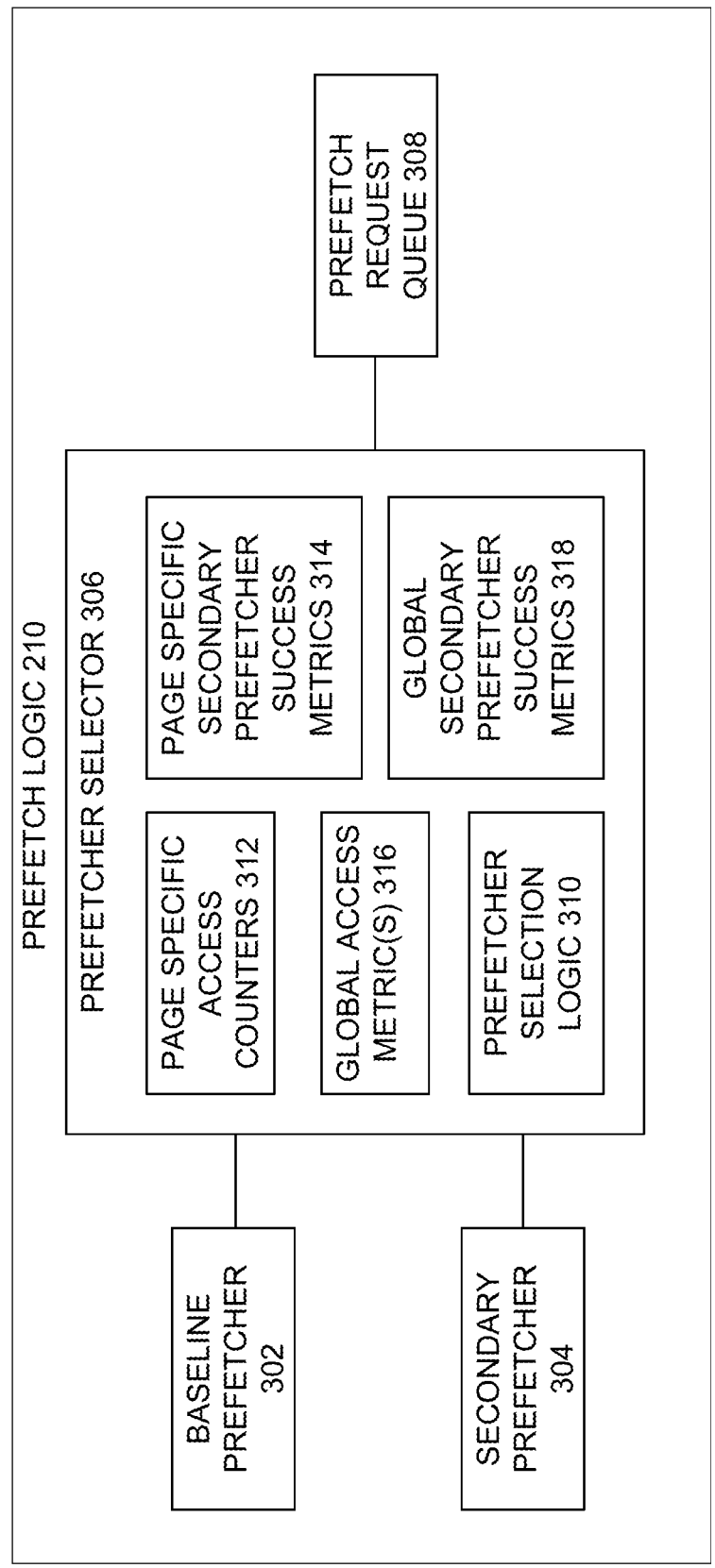
FIG. 3 is a block diagram of prefetch logic including a baseline prefetcher and a secondary prefetcher in accordance with certain embodiments.

FIG. 3 is a block diagram of prefetch logic 210 including a baseline prefetcher 302 and a secondary prefetcher 304 in accordance with certain embodiments. Prefetch logic 210 also includes a prefetcher selector 306 and a prefetch request queue 308.

The baseline prefetcher 302 may be any suitable type of prefetcher. Nonlimiting examples of prefetchers that may be used as baseline prefetcher 302 include a streamer prefetcher, a spatial prefetcher (e.g., an adjacent line prefetcher), an access map pattern matching prefetcher, a feedback directed prefetcher, a sandbox prefetcher, a spatial memory streaming prefetcher, any other prefetcher described herein, or other suitable prefetcher. In various embodiments, the baseline prefetcher 302 may be a relatively aggressive prefetcher (e.g., the baseline prefetcher 302 may be more likely on average to determine that data should be prefetched as compared to the secondary prefetcher 304).

The secondary prefetcher 304 may also be any suitable type of prefetcher. Nonlimiting examples of prefetchers that may be used as secondary prefetcher 304 include a Variable Length Delta Prefetcher (VLDP) (e.g., as described in "Efficiently Prefetching Complex Address Patterns", available at https://www.cs.utah.edu/~rajeev/pubs/micro15m.pdf), an instruction program counter stride prefetcher, a best offset prefetcher, a global history buffer prefetcher, any other prefetcher described herein, or other suitable prefetcher. In various embodiments, the secondary prefetcher 304 may be a relatively conservative prefetcher (e.g., the secondary prefetcher 304 may be less likely on average to determine that data should be prefetched as compared to the baseline prefetcher 302). In a particular embodiment, secondary prefetcher 304 is a complex pattern-based prefetcher, such as VLDP. In various embodiments, a particular type of prefetcher's suitability for use as a baseline prefetcher 302 or a secondary prefetcher 304 may be based on the particular configuration parameters selected for the prefetcher.

The baseline prefetcher 302 and the secondary prefetcher 304 may each be operable to prefetch data into a mid-level cache, such as L2 cache 206. Any suitable data may be prefetched, such as instructions to be executed by a microprocessor 106 of a core 102 or data to be used (e.g., as an operand) during execution of an instruction by the microprocessor 106. Prefetching data into a midlevel cache may include requesting that data be placed into the midlevel cache prior to (e.g., in anticipation of) a request for the data being received at the midlevel cache from a lower level cache (e.g., L1 cache 202) and/or the microprocessor 106. This may include placing a prefetch request identifying the data into prefetch request queue 308. If the data is not located in the midlevel cache, the prefetch request may result in the data being requested (e.g., from another cache or from system memory 134) by the midlevel cache.

In various embodiments, prefetchers 302 and 304 train on L1 cache misses. The baseline prefetcher 302 and the secondary prefetcher 304 observe the exact same stream of L1 cache misses and generate prefetch requests based on the misses according to their respective prefetch algorithms. In various embodiments, the prefetcher selector 306 is able to constrain one or both of these prefetchers from issuing their generated prefetch requests to the prefetch request queue 308. In various embodiments, the prefetcher selector 306 does not impact prefetcher training (that is, the prefetchers will train on the L1 cache misses and generate the same prefetch requests as compared to a system in which prefetcher selector 306 is not present). Some prefetchers may include the ability to detect whether their prefetch requests were accurate (i.e., whether the data that was prefetched was actually used by the microprocessor 106), and the prefetcher selector 306 does not interfere with this function. This may be advantageous because one of the inputs to the prefetcher selector 306 may be the prefetch coverage (e.g., success rate) of one (or both) of the prefetchers, and such coverage may be determined by the respective prefetchers without placing prefetch requests generated by the prefetchers into the prefetch request queue 308.

In various embodiments, the baseline prefetcher 302 and the secondary prefetcher 304 track a particular number of pages of data. That is, a prefetcher tracks L1 cache misses for cache lines from a particular number of pages and determines whether to prefetch data of the pages that it is currently tracking (thus at least in some embodiments a prefetcher does not generate prefetch requests for data of a page that it is not currently tracking). In a particular embodiment, when the prefetcher is tracking a number of pages equal to the limit of the number of pages trackable by the prefetcher and receives an L1 cache miss for a cache line of a new page, the prefetcher stops tracking one of the pages and begins to track the new page. In various embodiments, the baseline prefetcher 302 and the secondary prefetcher 304 track the same pages.

A prefetcher may track any number of pages (e.g., between 10 and 128 pages), such as 16, 32, 64, 128, or other suitable number of pages. The pages tracked by the prefetchers may be any suitable size, such as 4 Kilobytes (KB) or other suitable size. In one embodiment, the page size is 4 KB and the cache line size is 64 bytes, such that a page may comprise 64 cache lines of data. Each of these cache lines may be identified by a memory address. In various embodiments, a portion of a memory address may identify a particular page and another portion of the memory address may identify a cache line within that page.

Prefetcher selector 306 is operable to select a prefetcher configuration for the baseline prefetcher 302 and the secondary prefetcher 304 based on at least one memory access metric. In various embodiments, the prefetcher configurations may be made on a page by page basis. For example, for a first page, a first prefetcher configuration may specify whether the baseline prefetcher 302 is to be enabled to prefetch data of the first page and whether the secondary prefetcher 304 is to be enabled to prefetch data of the first page; for a second page, a second prefetcher configuration may specify whether the baseline prefetcher 302 is to be enabled to prefetch data of the second page and whether the secondary prefetcher 304 is to be enabled to prefetch data of the second page; and so on. In an embodiment, the prefetcher selector 306 determines a prefetcher configuration for each page tracked by the baseline and secondary prefetchers.

In a particular embodiment, a prefetcher configuration may specify one of the following: the baseline prefetcher 302 is to be enabled to prefetch data (i.e., to issue prefetch requests to be performed by the L2 cache) of a particular page and the secondary prefetcher 304 is not to be enabled to prefetch data of the particular page, the baseline prefetcher 302 is not to be enabled to prefetch data of the particular page and the secondary prefetcher 304 is to be enabled to prefetch data of the particular page, or neither the baseline prefetcher 302 nor the secondary prefetcher 304 are to be enabled to prefetch data of the particular page.

The prefetcher selector 306 may make a determination of an initial prefetcher configuration for each page that is tracked by the prefetchers. The prefetcher selector 306 may also adjust the prefetcher configurations at any suitable time. In various embodiments, the initial and subsequent prefetcher configurations may be based on at least one memory access metric. Any suitable memory access metrics may be used. For example, a memory access metric may include or be based on a number of requested cache lines of a particular page, a number of times that a prefetcher (e.g., the baseline prefetcher or the secondary prefetcher) has accurately predicted prefetches for data of a particular page, a metric based upon the number of times that cache lines of a plurality of pages has been requested, a metric based upon the number of times that a prefetcher has accurately predicted prefetches for cache lines of a plurality of pages, or other suitable metric indicative of memory access patterns or prefetcher performance.

In the embodiment depicted, prefetcher selector 306 tracks memory access metrics including page specific access counts tracked by counters 312, global access metrics 316, page specific secondary prefetcher success metrics 314, and global secondary prefetcher success metrics 318. Prefetcher selector 306 also includes prefetcher selection logic 310 which uses one or more memory access metrics to determine prefetcher configurations.

Page specific access counters 312 may include a plurality of counters that each track the total number of accesses to a particular page. For example, a first page specific access counter may track the number of accesses to a first page, a second page specific access counter may track the number of accesses to a second page, etc. The number of cache lines that have been requested from a particular page may be referred to herein as a "local access count." As an example, each time an L1 miss is detected for any cache line belonging to a first page, the first counter may be incremented. If the prefetchers stop tracking a particular page, the counter for that page may be reset and repurposed for a new page that is to be tracked. In a particular embodiment, a counter may be incremented for each cache line that is requested by the L1 cache.

Page specific secondary prefetcher success metrics 314 may include one or more indications of prefetcher success of the secondary prefetcher 304, where prefetcher success occurs when the secondary prefetcher generates a prefetch request for a particular cache line and the L1 cache requests that cache line at a later time (e.g., before that cache line is evicted from the L2 cache or within other constraints). A prefetcher success may occur even if the data was not actually prefetched (e.g., because the secondary prefetcher 304 was disabled from sending its prefetch requests to prefetch request queue 308). In a particular embodiment, the secondary prefetcher 304 may report indications of its success to the prefetcher selector 306 which stores indication of the successful prefetches as page specific secondary prefetcher success metrics 314. In a particular embodiment, the prefetch logic 210 may include a plurality of counters that each correspond to a particular page being tracked. Each counter may track the number of times that cache lines of the page corresponding to the counter have been successfully prefetched. The number of prefetch requests for cache lines that have been accurately generated by the secondary prefetcher for a particular page may be referred to herein as a "local success count." The counter may be included within the secondary prefetcher 304 or within prefetcher selector 306. Thus, in various embodiments, the secondary prefetcher 304 may periodically report prefetch success counts to the prefetcher selector 306 or may report each successful prefetch (and the prefetcher selector 306 may count the number of successful prefetches). In various embodiments, any other suitable page specific secondary prefetcher success metrics 314 may be used. For example, a prefetch accuracy rate (which indicates the % of prefetch requests that are verified as being accurate) or a prefetch timeliness metric (a measure of whether data identified by a prefetch request timely arrived at the L2 cache before the data was requested by the L1 cache) may be used.

Global access metrics 316 may include one or more metrics based on requests for the cache lines of all of the tracked pages. In some embodiments, a global access metric 316 is generated based on a counter that is incremented each time a cache line from a page being tracked is requested. For example, a global access metric may include or be based on a sum of all of the counts indicating the number of times cache lines from each page have been requested. As another example, a global access metric may be an average (or a weighted average) of the number of requests for cache lines from each page (a "global access average"). In another embodiment, the global access average may include the average number of accesses for a subset of the pages being tracked, such as the last N pages that have been accessed by the L1 cache, where N is any suitable integer.

In a particular embodiment, when a page is deallocated in favor of a new page, the global access average may be calculated based on the current global access average (which may be an average number of accesses across all or a subset of the tracked pages) and the access count for the page being deallocated. As one example, the following formula may be used to calculate a global access average: new global access average=((3*current global access average)+access count for deallocated page)/4. As another example, the following formula may be used to calculate a new global access average: new global access average=((7*current global access average)+access count for deallocated page)/8. In various embodiments, the new global success average may be determined by weighting the current global success average using any suitable weight and adding it to a weighted access count for the deallocated page (again using any suitable weight). In some embodiments, the sum of the weights may be one.

Global secondary prefetcher success metrics 318 may include one or more metrics based on successful prefetch requests by the secondary prefetcher 304 for cache lines of all of the tracked pages (or at least a subset of the tracked pages). For example, a global access metric may include or be based on a sum of counts indicating the number of times that prefetch requests for cache lines from each page were generated accurately. As another example, a global secondary prefetcher success metric may be an average number (across all or a subset of the pages being tracked) of prefetch requests that were generated accurately. In some embodiments, a global secondary prefetcher success metric is generated by a counter that is incremented each time a prefetch request for a cache line from a page being tracked is accurately generated (e.g., the cache line is later requested by the L1 cache).

In a particular embodiment, a global secondary prefetcher success metric 318 is an average (or weighted average) of the number of successfully generated prefetch requests across the pages being tracked or a subset thereof (a "global success average"). In one embodiment, the global success average may include the average number of successful prefetch requests for the last N pages that have been accessed by the L1 cache, where N is any suitable integer.

In a particular embodiment, when a page is deallocated in favor of a new page, a new global success average may be calculated based on the current value of the global success average and the number of accurate prefetch requests generated by the secondary prefetcher 304 for the page being deallocated. As one example, the following formula may be used to calculate a new global success average: new global success average=((3*current global success average)+number of accurate prefetch requests generated for deallocated page)/4. As another example, the following formula may be used to calculate a new global success average: new global success average=((7*current global success average)+number of accurate prefetch requests generated for deallocated page)/8. In other embodiments, the new global success average may be determined by weighting the current global success average using any suitable weight and adding it to a weighted count of accurate prefetch requests for the deallocated page (again using any suitable weight). In some embodiments, the sum of the weights may be one.

In various embodiments, a prefetcher configuration for a particular page is selected based on one or more of the access metrics and one or more thresholds corresponding to the one or more access metrics. As one example, an initial prefetcher configuration may be selected based on the global success average, a global success average threshold, the global access average, and a global access average threshold. In a particular embodiment, when an initial prefetcher configuration is selected for a new page, if the global access average is equal to or greater than the global access average threshold (indicating relatively high spatial locality in the pages being tracked), the initial prefetcher configuration for the page may be set to enable the baseline prefetcher 302 for the page and disable the secondary prefetcher 304 for the page. If the global access average is less than the global access average threshold, but the global success average is greater than or equal to the global success average threshold (indicating that at least a nominal benefit is likely to be achieved if the secondary prefetcher 304 is used), then the initial prefetcher configuration for the page may be set to enable the secondary prefetcher 304 for the page and to disable the baseline prefetcher 302 for the page. If the global access average is less than the global access average threshold and the global success average is less than the global success average threshold, then the initial prefetcher configuration for the page may be set to disable the baseline prefetcher 302 and the secondary prefetcher 304 for the page. In various embodiments herein, a prefetcher being "disabled" may refer to a state in which prefetch requests generated by the prefetcher are not passed to the L2 cache (e.g., the prefetcher may continue to operate, but its generated requests are not passed to the L2 cache) while a prefetcher being "enabled" may refer to a state in which prefetch requests generated by the prefetcher are passed to the L2 cache.

In various embodiments, a prefetcher configuration for a particular page may be modified by the prefetcher selector 306 based on any suitable access metrics, such as a local access count (e.g., the number of cache lines of the page that have been requested by an L1 cache) and a local success count (e.g., the number of accurate prefetch requests generated by the secondary prefetcher 304 for that page) for the particular page, and associated thresholds. As an example, if the baseline prefetcher 302 and the secondary prefetcher 304 are both disabled for a particular page and the local success count crosses an associated threshold (i.e., a local success count threshold), the secondary prefetcher 304 may be enabled for that page. As another example, if the baseline prefetcher 302 and the secondary prefetcher 304 are both disabled for a particular page or the secondary prefetcher 304 is enabled for the page and the local access count crosses an associated threshold ("local access count threshold"), the baseline prefetcher 302 may be enabled for that page. In various embodiments, the transition of the prefetcher configuration for a particular page does not affect the prefetcher configurations of the other pages being tracked.

In a particular embodiment, once the secondary prefetcher 304 has been enabled for a page, it will remain enabled unless the page is deallocated in favor of a new page or the baseline prefetcher 302 is enabled for the page (i.e., the configuration for the page will not transition to both prefetchers being disabled). Similarly, once the baseline prefetcher 302 is enabled for a page, it may remain enabled until the page is deallocated (i.e., the configuration for the page will not transition to both prefetchers being disabled or the secondary prefetcher being enabled). In other embodiments, one or both of the baseline prefetcher 302 and the secondary prefetcher 304 may be disabled if memory access metrics indicate the respective prefetcher(s) has become ineffective.

In various embodiments, any suitable integers may be used for the various thresholds used to determine prefetcher configurations. In a particular embodiment, the local access count threshold may be 18, such that if there are on average 18 or more accesses in each page (or at least a subset of the pages tracked) encountered by the program (according to the average calculated by the prefetcher selector 306), then baseline prefetcher 302 is enabled for a newly allocated page. In one embodiment, the local success count threshold is 3. Thus, if on average the secondary prefetcher has predicted three successful prefetches per page (and the baseline prefetcher 302 is not to be enabled) according to the method used to calculate the local success count, the secondary prefetcher 304 is enabled. In various embodiments, if both prefetchers meet the respective thresholds, the baseline prefetcher 302 is enabled for the page and the secondary prefetcher 304 is disabled.

In some embodiments, the global access average threshold that is used to determine whether the baseline prefetcher 302 should be enabled during selection of an initial configuration is equal to the local access count threshold that is used to determine whether the baseline prefetcher 302 should be enabled subsequent to the selection of an initial configuration for a particular page. In other embodiments, different values may be used for the global access average threshold and the page specific local access count threshold.

In some embodiments, the global success average threshold that is used to determine whether the secondary prefetcher 304 should be enabled during selection of an initial configuration is equal to the local success count threshold that is used to determine whether the secondary prefetcher 304 should be enabled subsequent to the selection of an initial configuration for a particular page. In other embodiments, different values may be used for the global success average threshold and the page specific local success count threshold.

In various embodiments, the local access count threshold and the local success count threshold may be the same for each page that is tracked.

Figure 4:
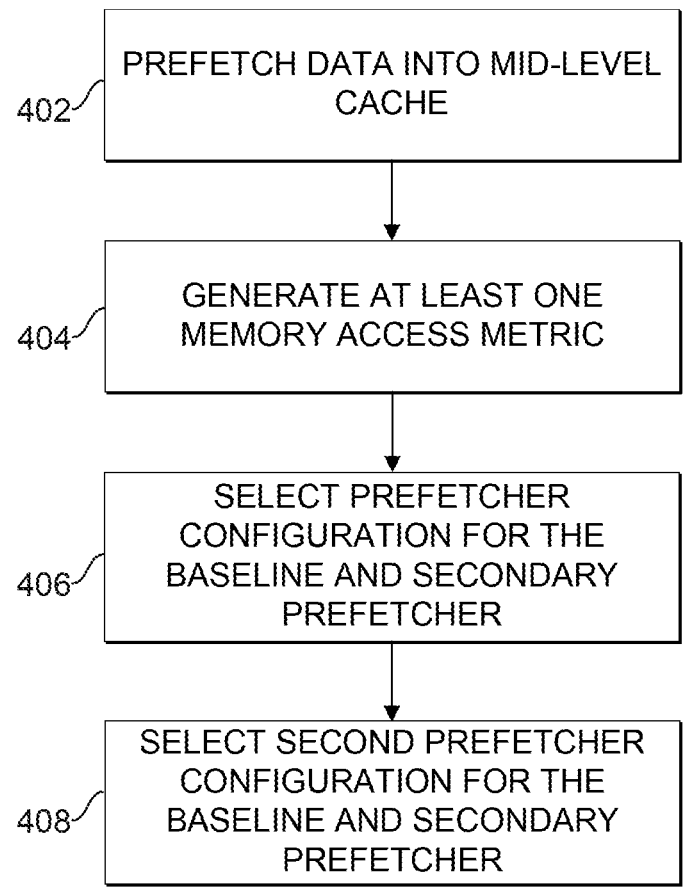
FIG. 4 is a flow for generating at least one memory access metric and selecting configurations for a baseline prefetcher and a secondary prefetcher in accordance with certain embodiments.

FIG. 4 is a flow for generating at least one memory access metric and selecting configurations for a baseline prefetcher 302 and a secondary prefetcher 304 in accordance with certain embodiments.

At 402, data is prefetched into a mid-level cache. This may include generating one or more prefetch requests by a baseline prefetcher 302 or a secondary prefetcher 304. The prefetch requests may be accessed by an L2 cache and used to request the data from a last level cache.

At 404, at least one memory access metric may be generated. The memory access metrics may be generated based on L1 cache misses. The memory access metrics may include any suitable metric, such as the number of times data from a particular page or a plurality of pages was accessed, the number of times a secondary prefetcher accurately generated prefetch requests, or other suitable metric.

At 406, a first prefetcher configuration for the baseline prefetcher 302 and the secondary prefetcher 304 is selected. In various embodiments, this may be an initial prefetcher configuration or a subsequent prefetcher configuration that is based on the at least one memory access metric. For example, an initial prefetcher configuration may be based on a global access average and a global success average and a subsequent prefetcher configuration may be based on a local access count and a local success count. In various embodiments, the prefetcher configuration may be selected for a first page of data.

At 408, a second prefetcher configuration is selected for the baseline prefetcher 302 and the secondary prefetcher 304. In various embodiments, the second prefetcher configuration may be an initial prefetcher configuration or a subsequent prefetcher configuration for a page of data that is different from the page of data for which the first prefetcher configuration is determined. Thus, the first prefetcher configuration may be applied to a first page of data while the second prefetcher configuration is applied to a second page of data. Thus, the same prefetchers may have different configurations for different pages.

Figure 5:
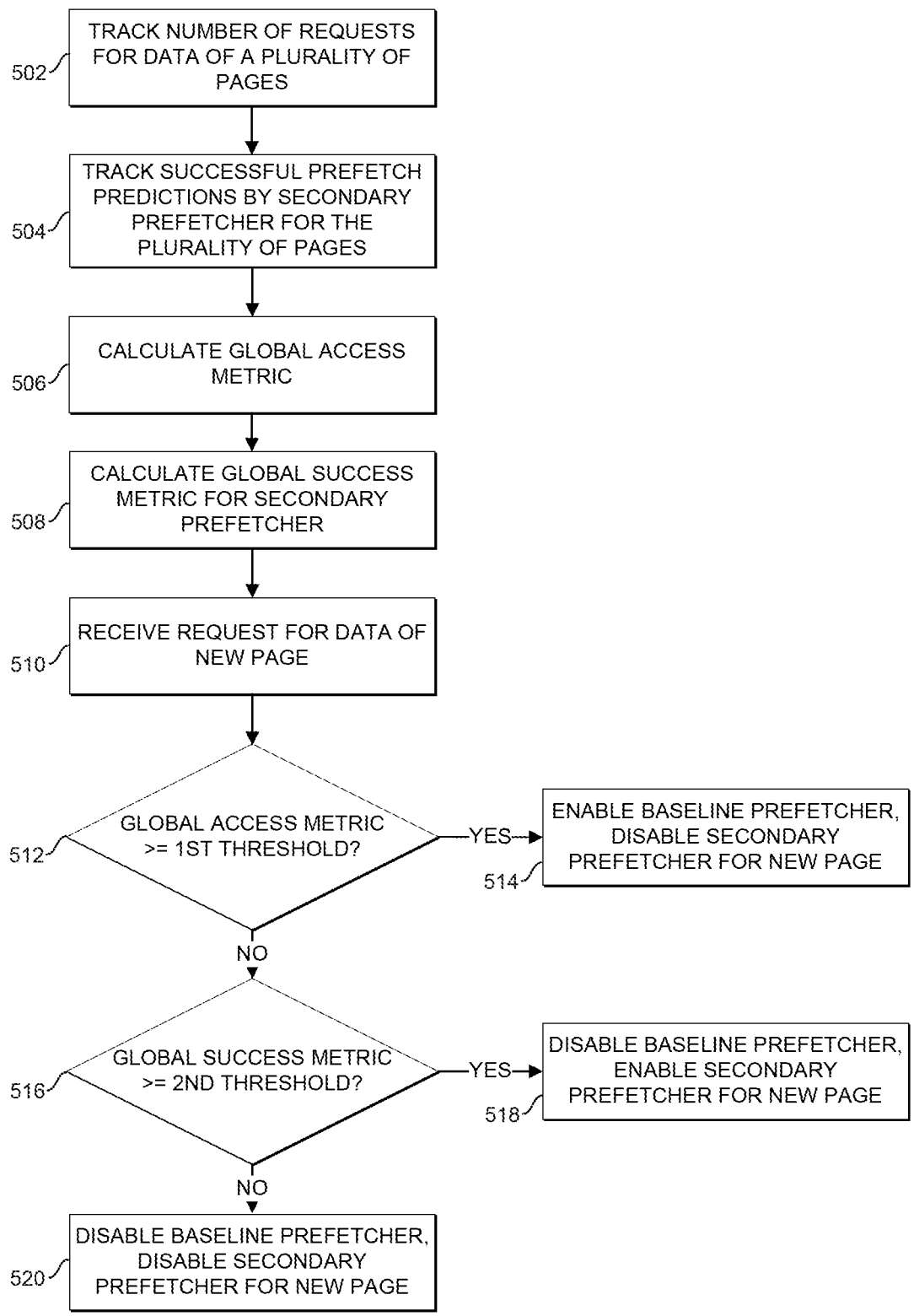
FIG. 5 is a flow for selecting an initial configuration for a baseline prefetcher and a secondary prefetcher in accordance with certain embodiments.

FIG. 5 is a flow for selecting an initial configuration for a baseline prefetcher 302 and a secondary prefetcher 304 in accordance with certain embodiments. At 502, a number of requests for data of a plurality of pages is tracked, for example, by prefetch logic 210. For example, the number of requests may be equal to the number of requests made by the L1 cache for cache lines of the pages. At 504, successful prefetch predictions by the secondary prefetcher 304 are tracked for the plurality of pages. A successful prefetch prediction may occur when the secondary prefetcher accurately generates a prefetch request, regardless of whether the prefetch request is issued to the L2 cache.

At 506, a global access metric is calculated. The global access metric may be based on the number of requests made by the L1 cache for data of a plurality of pages. For example, the global access metric may be a global access average indicative of the number of cache lines accessed from all of the pages being tracked or a subset thereof. At 508 a global success metric is calculated for the secondary prefetcher. The global success metric may be based on the number of successful prefetch predictions by the secondary prefetcher for data of a plurality of pages. For example, the global success metric may be a global success average indicative of the average number of successful prefetch predictions for cache lines all of the pages being tracked or a subset thereof.

At 510, a request for data of a new page is received. A new page may comprise a page that is not currently being tracked by the prefetch logic 210. The request may be made by, for example, an L1 cache. At 512, a determination is made as to whether a global access metric is greater than or equal to a first threshold corresponding to the global access metric. If the global access metric is greater than or equal to the first threshold, then baseline prefetcher 302 is enabled to issue prefetch requests for the new page and secondary prefetcher 304 is disabled from issuing prefetch requests for the new page (though at least in some embodiments the secondary prefetcher may generate prefetch requests for the new page) at 514. If the global access metric is less than the first threshold, then the flow moves to 516.

At 516, a determination is made as to whether the global success metric is greater than or equal to a second threshold corresponding to the global success metric. If the global success metric is greater than or equal to the second threshold, then the baseline prefetcher is disabled from issuing prefetch requests for the new page (though at least in some embodiments the baseline prefetcher may generate prefetch requests for the new page) and the secondary prefetcher is enabled to issue prefetch requests for the new page at 518. If the global success metric is less than the second threshold, the baseline prefetcher and the secondary prefetcher are disabled from issuing prefetch requests for the new page (though at least in some embodiments both prefetchers may generate prefetch requests for the new page) at 520.

Figure 6:
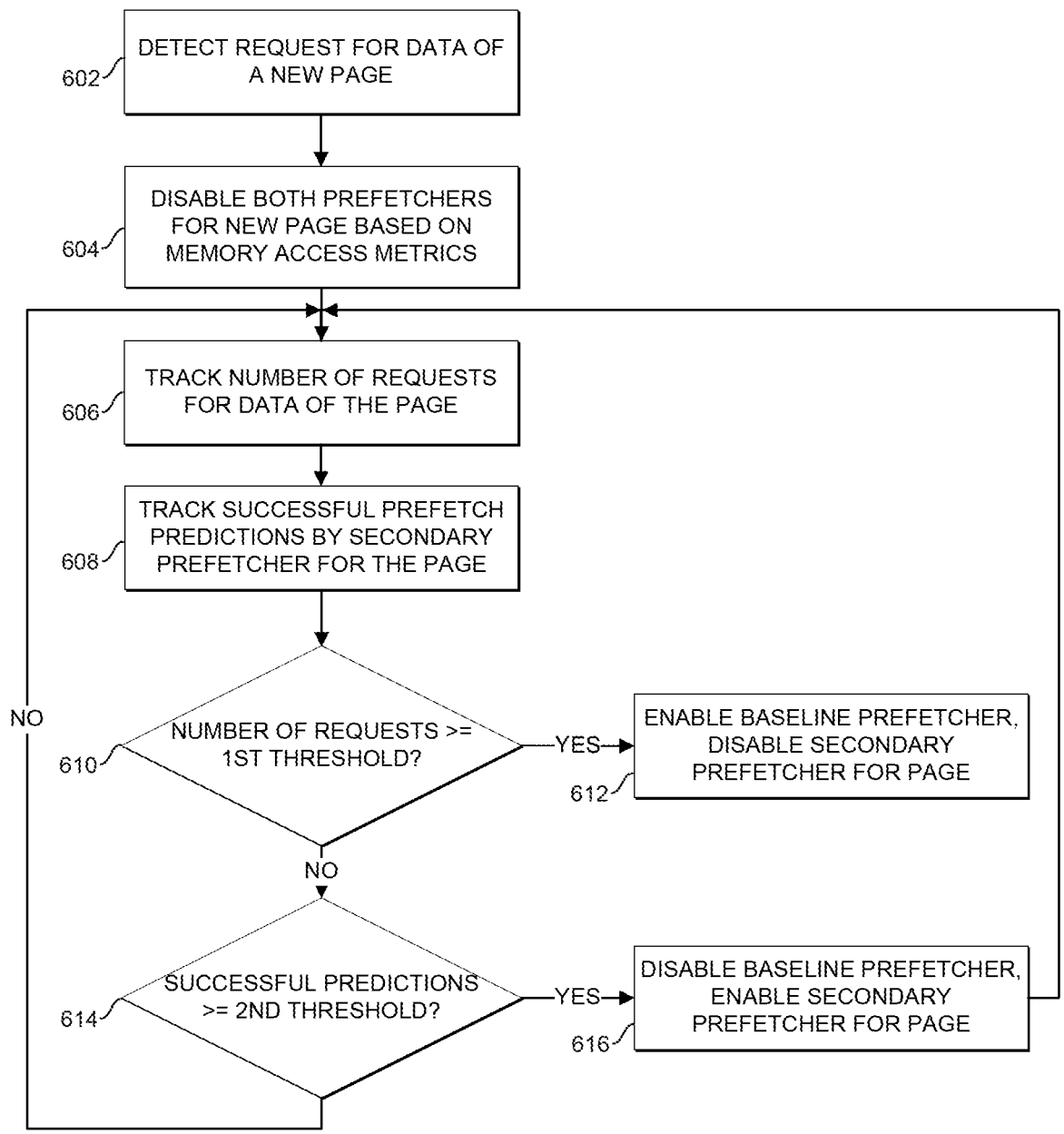
FIG. 6 is a flow for adjusting a configuration for a baseline prefetcher and a secondary prefetcher in accordance with certain embodiments.

FIG. 6 is a flow for adjusting a configuration for a baseline prefetcher and a secondary prefetcher in accordance with certain embodiments. The flow depicted assumes that the initial prefetcher configuration disabled both the baseline prefetcher 302 and the secondary prefetcher 304 from issuing prefetch requests for a particular page, though some of the operations depicted may be performed regardless of the initial prefetcher configuration that is selected for the particular page.

At 602, a request for data of a new page is detected. At 604, both prefetchers are disabled from issuing prefetch requests for the new page based on memory access, such as global memory access metrics. For example, the prefetchers may be disabled when the initial prefetcher configuration is determined.

At 606, a number of requests for data of the page are tracked. For example, a counter may be incremented each time a cache line of the page is requested by an L1 cache. At 608, a number of successful prefetch predictions made by the secondary prefetcher for the page are tracked. For example, each time the secondary prefetcher generates an accurate prefetch prediction for a cache line of the page, a counter may be incremented.

At 610, a determination is made as to whether the number of requests for data of the pages is greater than or equal to a first threshold corresponding to the number of requests. If the number of requests is greater than or equal to the first threshold, then at 612 the baseline prefetcher is enabled to issue prefetch requests to the L2 cache for the page and the secondary prefetcher is disabled from issuing prefetch requests to the L2 cache for the page and the flow ends. If the number of requests is less than the first threshold, then at 614 a determination is made as to whether the number of successful prefetch predictions made by the secondary prefetcher is greater than or equal to a second threshold corresponding to the number of successful predictions. If the number of successful predictions is greater than or equal to the second threshold, then the baseline prefetcher is disabled for issuing prefetch requests to the L2 cache and the secondary prefetcher is enabled to issue prefetch requests to the L2 cache for the page at 616. The flow then returns to 606. If the number of successful predictions is less than the second threshold, then the flow may return to 606. In various embodiments, once the secondary prefetcher is enabled at 616, the determination made at 614 is omitted during future iterations of the flow.

The flows described in FIGS. 4-6 are merely representative of operations that may occur in particular embodiments. In other embodiments, additional operations may be performed. Various embodiments of the present disclosure contemplate any suitable signaling mechanisms for accomplishing the functions described herein. Some of the operations illustrated in FIGS. 4-6 may be repeated, combined, modified, or omitted where appropriate. Additionally, operations may be performed in any suitable order without departing from the scope of particular embodiments.

Although a single baseline prefetcher 302, secondary prefetcher 304, and prefetcher selector 306 have been described in this specification, a processor 100 may include any suitable number of baseline prefetchers 302, secondary prefetchers 306, and prefetcher selectors 306. For example, each L2 cache (or a subset of the L2 caches) may have a separate instance of prefetch logic 210 to issue prefetch requests for the particular L2 cache.

The figures below detail exemplary architectures and systems to implement embodiments of the above. In some embodiments, one or more hardware components and/or instructions described above are emulated as detailed below, or implemented as software modules.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 7A is a block diagram illustrating both an exemplary in-order pipeline and an exemplary register renaming, out-of-order issue/execution pipeline according to embodiments of the disclosure. FIG. 7B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression and/or decompression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a system memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8B:
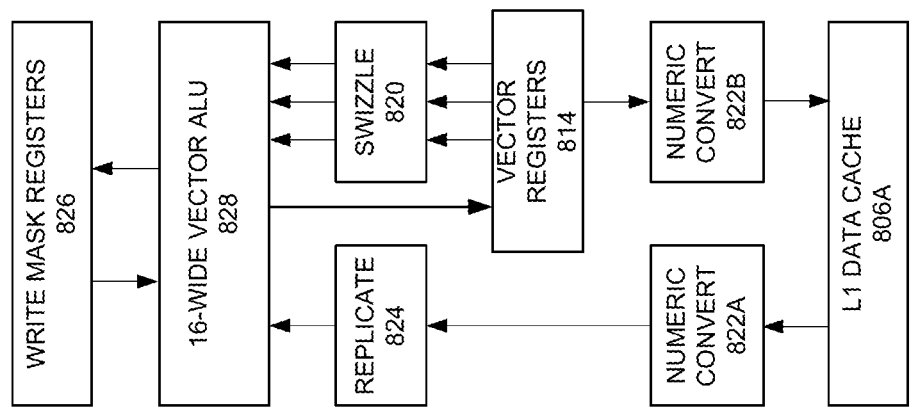
FIGS. 8A-B illustrate a block diagram of a more specific exemplary in-order core architecture, which core would be one of several logic blocks (potentially including other cores of the same type and/or different types) in a chip in accordance with certain embodiments.
Figure 8A:
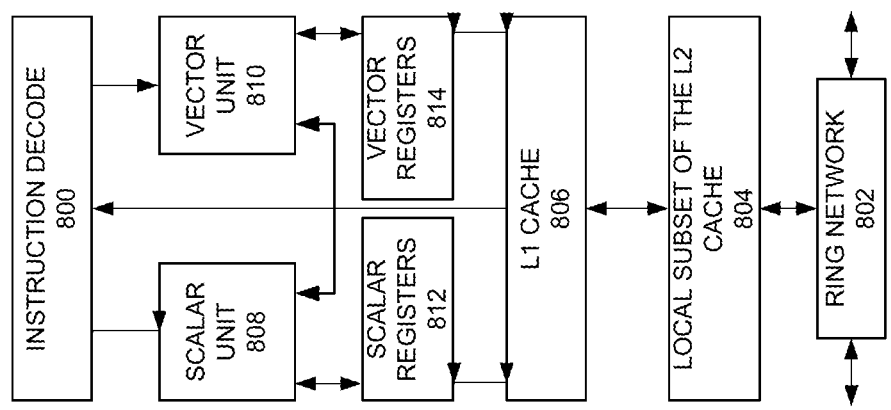

FIGS. 8A-B illustrate a block diagram of a more specific exemplary in-order core architecture, which core would be one of several logic blocks (potentially including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to various embodiments. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments may use a different approach (e.g., use a single register set or include a communication path that allow data to be transferred between the two register files without being written and read back).

The local subset of the L2 cache 804 is part of a global L2 cache that is divided into separate local subsets (in some embodiments one per processor core). Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. In a particular embodiment, each ring data-path is 1012-bits wide per direction.

FIG. 8B is an expanded view of part of the processor core in FIG. 8A according to embodiments. FIG. 8B includes an L1 data cache 806A (part of the L1 cache 806), as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
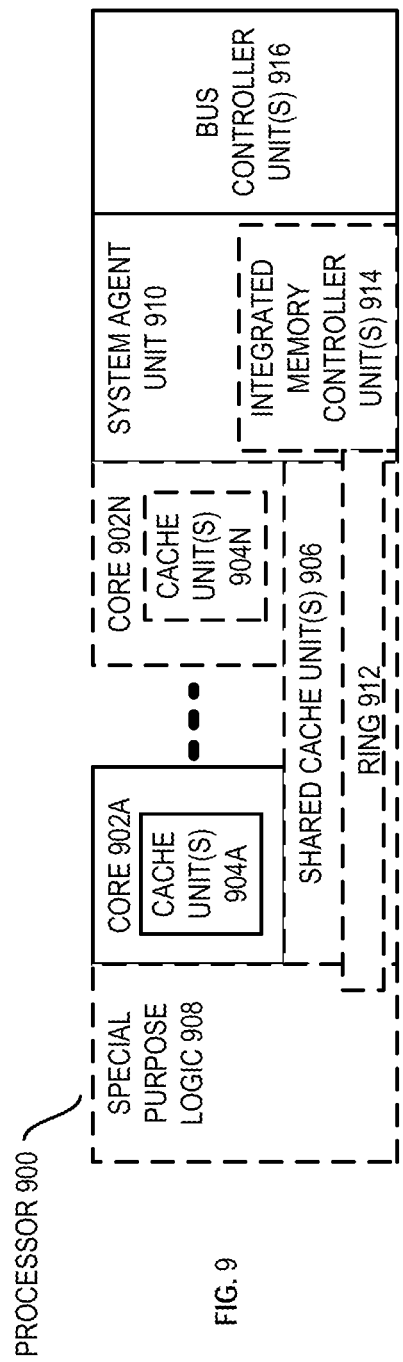
FIG. 9 is a block diagram of a processor that may have more than one core, may have an integrated memory controller, and may have integrated graphics in accordance with certain embodiments.

FIG. 9 is a block diagram of a processor 900 that may have more than one core, may have an integrated memory controller, and may have integrated graphics according to various embodiments. The solid lined boxes in FIG. 9 illustrate a processor 900 with a single core 902A, a system agent 910, and a set of one or more bus controller units 916; while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, or a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor, or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 900 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic (e.g., integrated graphics logic) 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of executing the same instruction set, while others may be capable of executing only a subset of that instruction set or a different instruction set.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 10:
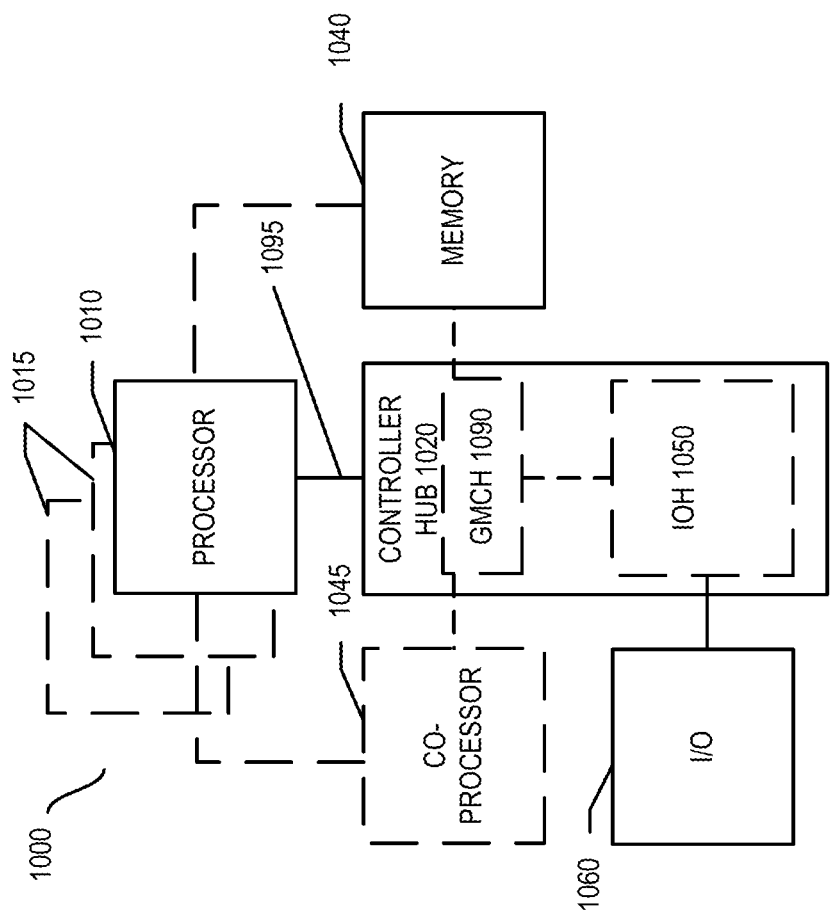
FIGS. 10, 11, 12, and 13 are block diagrams of exemplary computer architectures in accordance with certain embodiments.

FIG. 10 depicts a block diagram of a system 1000 in accordance with one embodiment of the present disclosure. The system 1000 may include one or more processors 1010, 1015, which are coupled to a controller hub 1020. In one embodiment, the controller hub 1020 includes a graphics memory controller hub (GMCH) 1090 and an Input/Output Hub (IOH) 1050 (which may be on separate chips or the same chip); the GMCH 1090 includes memory and graphics controllers coupled to memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 is a single chip comprising the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), other suitable memory, or any combination thereof. The memory 1040 may store any suitable data, such as data used by processors 1010, 1015 to provide the functionality of computer system 1000. For example, data associated with programs that are executed or files accessed by processors 1010, 1015 may be stored in memory 1040. In various embodiments, memory 1040 may store data and/or sequences of instructions that are used or executed by processors 1010, 1015.

In at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression and/or decompression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
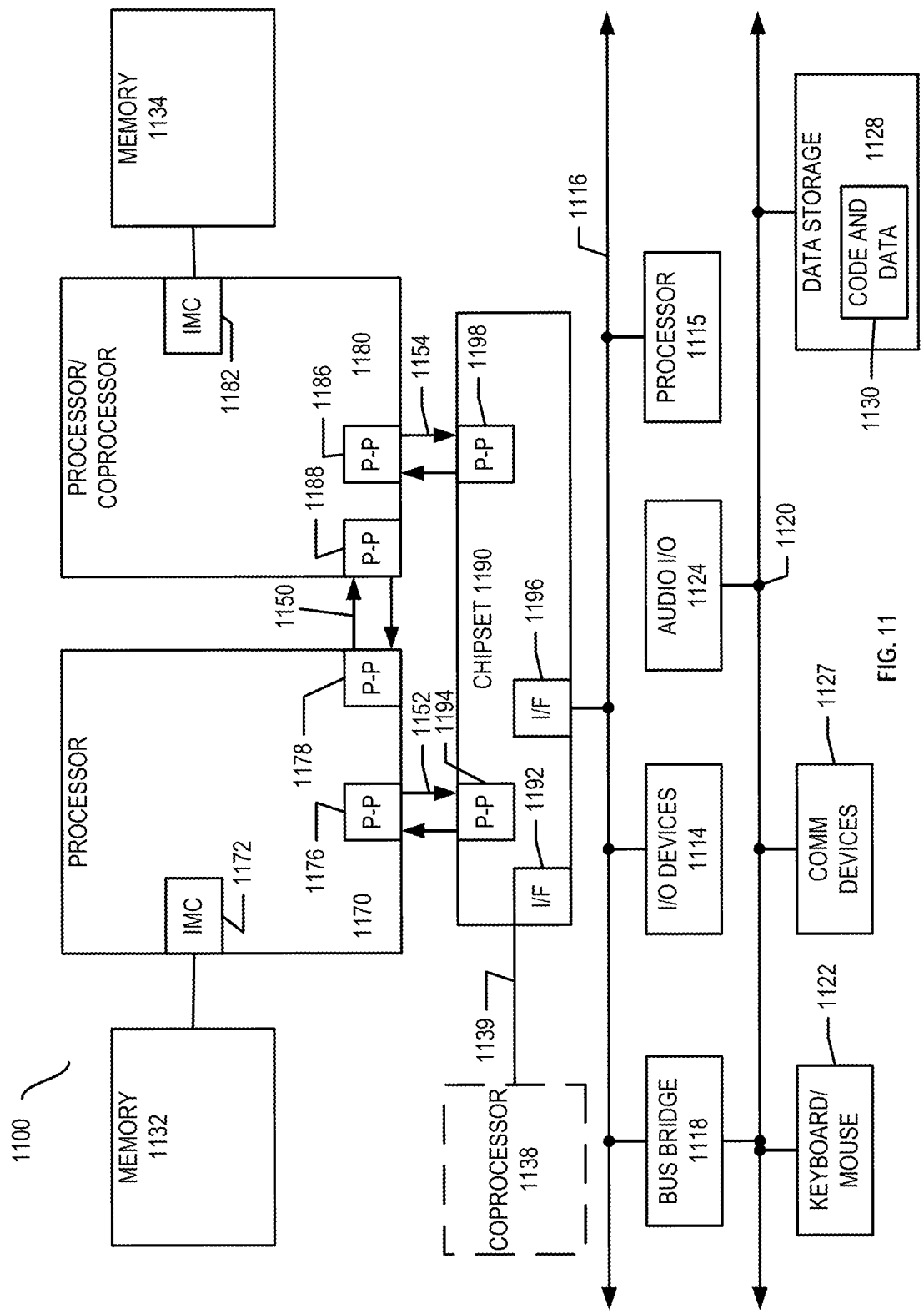

FIG. 11 depicts a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the disclosure, processors 1170 and 1180 are respectively processors 1010 and 1015, while coprocessor 1138 is coprocessor 1045. In another embodiment, processors 1170 and 1180 are respectively processor 1010 and coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172, and 1182 couple the processors to respective memories, namely a memory 1132 and a memory 1134, which may be portions of system memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are contemplated by this disclosure. For example, instead of the point-to-point architecture of FIG. 11, a system may implement a multi-drop bus or other such architecture.

Figure 12:
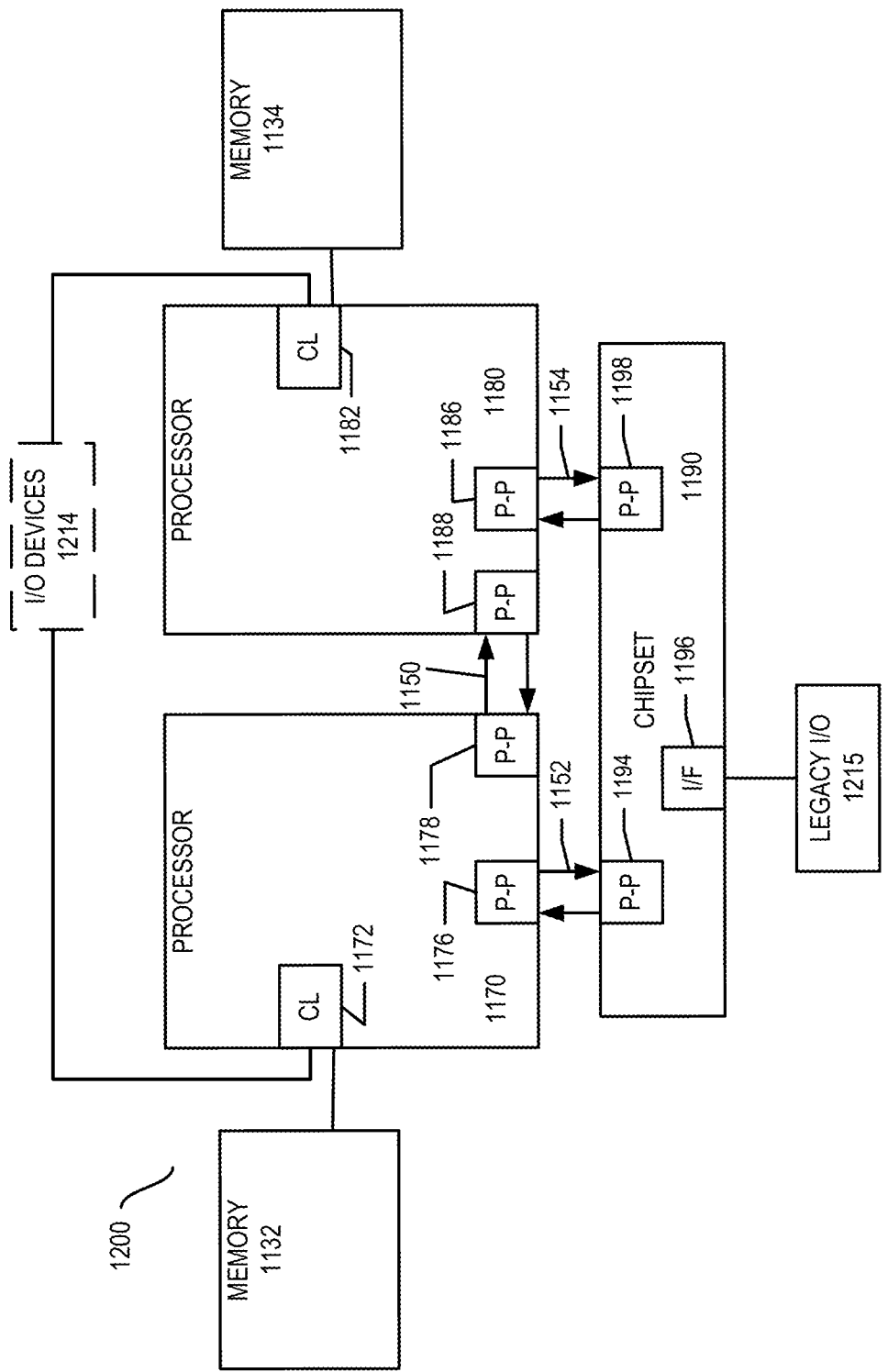

FIG. 12 depicts a block diagram of a second more specific exemplary system 1200 in accordance with an embodiment of the present disclosure. Similar elements in FIGS. 11 and 12 bear similar reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
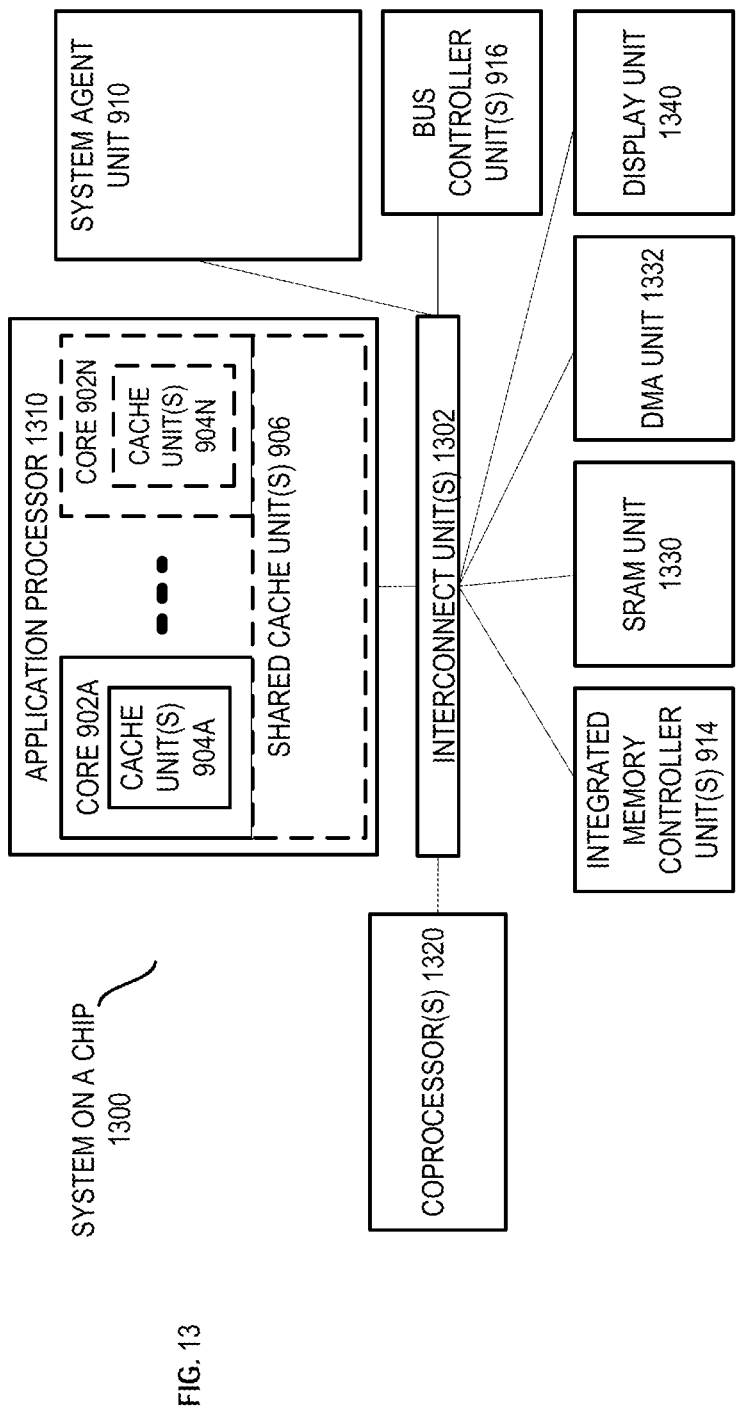

FIG. 13 depicts a block diagram of a SoC 1300 in accordance with an embodiment of the present disclosure. Similar elements in FIG. 9 bear similar reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation, or any other process, allows a processor or other electronic device that does not have an x86 instruction set processor or core to execute the x86 binary code 1406.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components such as processor 100, cores 102, cache agents 112, caches 114, system memory 134, L1 cache two, L2 cache 206, L2 cache control logic 208, prefetch logic 210, baseline prefetcher 302, secondary prefetcher 304, prefetcher selector 306, prefetch request queue 308, other component described herein, or any subcomponent of any of these components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a first prefetcher comprising circuitry, the first prefetcher to generate prefetch requests to prefetch data into a mid-level cache; a second prefetcher comprising circuitry, the second prefetcher to generate prefetch requests to prefetch data into the mid-level cache; and a prefetcher selector to select a prefetcher configuration for the first prefetcher and the second prefetcher based on at least one memory access metric, wherein the prefetcher configuration is to specify whether the first prefetcher is to be enabled to issue, to the mid-level cache, prefetch requests for data of a particular page and whether the second prefetcher is to be enabled to issue, to the mid-level cache, prefetch requests for data of the particular page.

In an embodiment, the prefetcher configuration is to specify that the first prefetcher is to be enabled to issue, to the mid-level cache, prefetch requests for data of the particular page and the second prefetcher is not to be enabled to issue, to the mid-level cache, prefetch requests for data of the particular page. In an embodiment, the prefetcher configuration is to specify that the first prefetcher is not to be enabled to issue, to the mid-level cache, prefetch data of the particular page and the second prefetcher is to be enabled to issue, to the mid-level cache, prefetch requests for data of the particular page. In an embodiment, the prefetcher configuration is to specify that the first prefetcher is not to be enabled to issue, to the mid-level cache, prefetch requests for data of the particular page and the second prefetcher is not to be enabled to issue, to the mid-level cache, prefetch requests for data of the particular page. In an embodiment, the prefetcher selector is further to select a second prefetcher configuration for the first prefetcher and the second prefetcher, wherein the second prefetcher configuration is to specify whether the first prefetcher is to be enabled to issue, to the mid-level cache, prefetch requests for data of a second page and whether the second prefetcher is to be enabled to issue, to the mid-level cache, prefetch requests for data of the second page, and wherein the prefetcher configuration and the second prefetcher configuration are to be concurrently applied to the first prefetcher and the second prefetcher. In an embodiment, the at least one memory access metric comprises a number of times that data of the particular page has been requested. In an embodiment, the at least one memory access metric comprises a number of times that the second prefetcher has generated accurate prefetch requests for data of the particular page. In an embodiment, the at least one memory access metric comprises a metric based upon the number of times that data of a plurality of pages has been requested. In an embodiment, the at least one memory access metric comprises a metric based upon the number of times that the second prefetcher has generated accurate prefetch requests for data of a plurality of pages. In an embodiment, the prefetcher selector is to select the prefetcher configuration as an initial prefetcher configuration for a particular page based on requests made for data of a plurality of other pages and to change the prefetcher configuration based on requests made for data of the particular page. In an embodiment, the data identified by the prefetch requests generated by the first prefetcher and the second prefetcher comprises instructions to be executed by a core of the processor. In an embodiment, the data identified by the prefetch requests generated by the first prefetcher and the second prefetcher comprises data operands to be used during execution of instructions by a core of the processor.

In at least one embodiment, a method comprises generating, by a first prefetcher, prefetch requests to prefetch data into a mid-level cache; generating, by a second prefetcher, prefetch requests to prefetch data into the mid-level cache; and selecting, by a prefetcher selector, a prefetcher configuration for the first prefetcher and the second prefetcher based on at least one memory access metric, wherein the prefetcher configuration is to specify whether the first prefetcher is to be enabled to issue, to the mid-level cache, prefetch requests for data of a particular page and whether the second prefetcher is to be enabled to issue, to the mid-level cache, prefetch requests for data of the particular page.

In an embodiment, the prefetcher configuration is to specify that the first prefetcher is to be enabled to issue, to the mid-level cache, prefetch requests for data of the particular page and the second prefetcher is not to be enabled to issue, to the mid-level cache, prefetch requests for data of the particular page. In an embodiment, the prefetcher configuration is to specify that the first prefetcher is not to be enabled to issue, to the mid-level cache, prefetch data of the particular page and the second prefetcher is to be enabled to issue, to the mid-level cache, prefetch requests for data of the particular page. In an embodiment, the prefetcher configuration is to specify that the first prefetcher is not to be enabled to issue, to the mid-level cache, prefetch requests for data of the particular page and the second prefetcher is not to be enabled to issue, to the mid-level cache, prefetch requests for data of the particular page. In an embodiment, the method further comprises selecting, by the prefetcher selector, a second prefetcher configuration for the first prefetcher and the second prefetcher, wherein the second prefetcher configuration is to specify whether the first prefetcher is to be enabled to issue, to the mid-level cache, prefetch requests for data of a second page and whether the second prefetcher is to be enabled to issue, to the mid-level cache, prefetch requests for data of the second page, and wherein the prefetcher configuration and the second prefetcher configuration are to be concurrently applied to the first prefetcher and the second prefetcher. In an embodiment, the at least one memory access metric comprises a number of times that data of the particular page has been requested. In an embodiment, the at least one memory access metric comprises a number of times that the second prefetcher has generated accurate prefetch requests for data of the particular page. In an embodiment, the at least one memory access metric comprises a metric based upon the number of times that data of a plurality of pages has been requested. In an embodiment, the at least one memory access metric comprises a metric based upon the number of times that the second prefetcher has generated accurate prefetch requests for data of a plurality of pages. In an embodiment, the method further comprises selecting, by the prefetcher selector, the prefetcher configuration as an initial prefetcher configuration for a particular page based on requests made for data of a plurality of other pages and changing the prefetcher configuration based on requests made for data of the particular page. In an embodiment, the data identified by the prefetch requests generated by the first prefetcher and the second prefetcher comprises instructions to be executed by a core of a processor. In an embodiment, the data identified by the prefetch requests generated by the first prefetcher and the second prefetcher comprises data operands to be used during execution of instructions by a core of a processor.

In at least one embodiment, a system comprises a system memory; and a processor comprising: a mid-level cache; a first prefetcher to generate prefetch requests to prefetch data from the system memory into the mid-level cache; a second prefetcher to generate prefetch requests to prefetch data from the system memory into the mid-level cache; and a prefetcher selector to select a prefetcher configuration for the first prefetcher and the second prefetcher based on at least one memory access metric, wherein the prefetcher configuration is to specify whether the first prefetcher is to be enabled to issue, to the mid-level cache, prefetch requests for data of a particular page and whether the second prefetcher is to be enabled to issue, to the mid-level cache, prefetch requests for data of the particular page.

In an embodiment, the at least one memory access metric comprises a number of times that data of the particular page has been requested. In an embodiment, the system further comprises a storage device to provide data to the system memory. In an embodiment, the system further comprises one or more of a battery communicatively coupled to the processor, a display communicatively coupled to the processor, or a network interface communicatively coupled to the processor.

In at least one embodiment, a system comprises first means for generating prefetch requests to prefetch data into a mid-level cache; second means for generating prefetch requests to prefetch data into the mid-level cache; and means for selecting a prefetcher configuration for the first means and the second means based on at least one memory access metric, wherein the prefetcher configuration is to specify whether the first means is to be enabled to issue, to the mid-level cache, prefetch requests for data of a particular page and whether the second means is to be enabled to issue, to the mid-level cache, prefetch requests for data of the particular page.

In an embodiment, the at least one memory access metric comprises a number of times that data of the particular page has been requested. In an embodiment, the at least one memory access metric comprises a number of times that the second prefetcher has generated accurate prefetch requests for data of the particular page. In an embodiment, the at least one memory access metric comprises a metric based upon the number of times that data of a plurality of pages has been requested. In an embodiment, the at least one memory access metric comprises a metric based upon the number of times that the second prefetcher has generated accurate prefetch requests for data of a plurality of pages.

In at least one embodiment, at least one machine readable storage medium has instructions stored thereon, the instructions when executed by a machine to cause the machine to: generate, by a first prefetcher, prefetch requests to prefetch data into a mid-level cache; generate, by a second prefetcher, prefetch requests to prefetch data into the mid-level cache; and select, by a prefetcher selector, a prefetcher configuration for the first prefetcher and the second prefetcher based on at least one memory access metric, wherein the prefetcher configuration is to specify whether the first prefetcher is to be enabled to issue, to the mid-level cache, prefetch requests for data of a particular page and whether the second prefetcher is to be enabled to issue, to the mid-level cache, prefetch requests for data of the particular page.

In an embodiment, the at least one memory access metric comprises a number of times that data of the particular page has been requested. In an embodiment, the at least one memory access metric comprises a number of times that the second prefetcher has generated accurate prefetch requests for data of the particular page. In an embodiment, the at least one memory access metric comprises a metric based upon the number of times that data of a plurality of pages has been requested. In an embodiment, the at least one memory access metric comprises a metric based upon the number of times that the second prefetcher has generated accurate prefetch requests for data of a plurality of pages.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a first prefetcher comprising circuitry, the first prefetcher configured to generate prefetch requests to prefetch data into a mid-level cache; a second prefetcher comprising circuitry,
the second prefetcher configured to generate prefetch requests to prefetch data into the mid-level cache;
a prefetcher selector to select a prefetcher configuration for the first prefetcher and the second prefetcher based on at least one memory access metric, wherein the prefetcher configuration is to specify whether the first prefetcher is enabled to issue, to the mid-level cache, prefetch requests for data of a particular page and whether the second prefetcher is enabled to issue, to the mid-level cache, prefetch requests for data of the particular page, wherein the selected prefetcher configuration is to specify that the first prefetcher is enabled to issue, to the mid-level cache, prefetch requests for data of the particular page and the second prefetcher is not enabled to issue, to the mid-level cache, prefetch requests for data of the particular page; and wherein the prefetcher configuration is modifiable by the prefetcher selector to specify that the first prefetcher is not enabled to issue, to the mid-level cache, prefetch requests for data of the particular page and the second prefetcher is not enabled to issue, to the mid-level cache, prefetch requests for data of the particular page.

2. The processor of claim 1, wherein the prefetcher configuration is selected from a first configuration to specify that the first prefetcher is enabled to issue, to the mid-level cache, prefetch requests for data of the particular page and the second prefetcher is not enabled to issue, to the mid-level cache, prefetch requests for data of the particular page, a second configuration to specify that the first prefetcher is not enabled to issue, to the mid-level cache, prefetch data of the particular page and the second prefetcher is enabled to issue, to the mid-level cache, prefetch requests for data of the particular page, and a third configuration to specify that the first prefetcher is not enabled to issue, to the mid-level cache, prefetch requests for data of the particular page and the second prefetcher is not enabled to issue, to the mid-level cache, prefetch requests for data of the particular page.

3. The processor of claim 1, wherein the prefetcher configuration is modified by the prefetcher selector to specify that the first prefetcher is not enabled to issue, to the mid-level cache, prefetch requests for data of the particular page and the second prefetcher is enabled to issue, to the mid-level cache, prefetch requests for data of the particular page.

4. The processor of claim 1, wherein the prefetcher selector is further to select a second prefetcher configuration for the first prefetcher and the second prefetcher, wherein the second prefetcher configuration is to specify whether the first prefetcher is enabled to issue, to the mid-level cache, prefetch requests for data of a second page and whether the second prefetcher is enabled to issue, to the mid-level cache, prefetch requests for data of the second page, and wherein the prefetcher configuration and the second prefetcher configuration are to be concurrently applied to the first prefetcher and the second prefetcher.

5. The processor of claim 1, wherein the at least one memory access metric comprises a number of times that data of the particular page has been requested.

6. The processor of claim 1, wherein the at least one memory access metric comprises a number of times that the second prefetcher has generated accurate prefetch requests for data of the particular page.

7. The processor of claim 1, wherein the at least one memory access metric comprises a metric based upon a number of times that data of a plurality of pages has been requested.

8. The processor of claim 1, wherein the at least one memory access metric comprises a metric based upon a number of times that the second prefetcher has generated accurate prefetch requests for data of a plurality of pages.

9. The processor of claim 1, wherein the prefetcher selector is to select the prefetcher configuration as an initial prefetcher configuration for the particular page based on requests made for data of a plurality of other pages and to change the prefetcher configuration based on requests made for data of the particular page.

10. The processor of claim 1, wherein data identified by the prefetch requests generated by the first prefetcher and the second prefetcher comprises instructions to be executed by a core of the processor.

11. The processor of claim 1, wherein data identified by the prefetch requests generated by the first prefetcher and the second prefetcher comprises data operands to be used during execution of instructions by a core of the processor.

12. A method comprising:
generating, by a first prefetcher, prefetch requests to prefetch data into a mid-level cache;
generating, by a second prefetcher, prefetch requests to prefetch data into the mid-level cache;
selecting, by a prefetcher selector, a prefetcher configuration for the first prefetcher and the second prefetcher based on at least one memory access metric, wherein the prefetcher configuration is to specify whether the first prefetcher is enabled to issue, to the mid-level cache, prefetch requests for data of a particular page and whether the second prefetcher is to be enabled to issue, to the mid-level cache, prefetch requests for data of the particular page, wherein the selected prefetcher configuration is to specify that the first prefetcher is enabled to issue, to the mid-level cache, prefetch requests for data of the particular page and the second prefetcher is not enabled to issue, to the mid-level cache, prefetch requests for data of the particular page; and
modifying, by the prefetcher selector, the prefetcher configuration to specify that the first prefetcher is not enabled to issue, to the mid-level cache, prefetch requests for data of the particular page and the second prefetcher is not enabled to issue, to the mid-level cache, prefetch requests for data of the particular page.

13. The method of claim 12, wherein the at least one memory access metric comprises a number of times that data of the particular page has been requested.

14. The method of claim 12, wherein the at least one memory access metric comprises a number of times that the second prefetcher has generated accurate prefetch requests for data of the particular page.

15. The method of claim 12, wherein the at least one memory access metric comprises a metric based upon a number of times that data of a plurality of pages has been requested.

16. A system comprising: a system memory; and a processor comprising: a mid-level cache;
a first prefetcher configured to generate prefetch requests to prefetch data from the system memory into the mid-level cache;
a second prefetcher configured to generate prefetch requests to prefetch data from the system memory into the mid-level cache;
a prefetcher selector to select a prefetcher configuration for the first prefetcher and the second prefetcher based on at least one memory access metric, wherein the prefetcher configuration is to specify whether the first prefetcher is enabled to issue, to the mid-level cache, prefetch requests for data of a particular page and whether the second prefetcher is enabled to issue, to the mid-level cache, prefetch requests for data of the particular page, wherein the selected prefetcher configuration k to specify that the first prefetcher is enabled to issue, to the mid-level cache, prefetch requests for data of the particular page and the second prefetcher is not enabled to issue, to the mid-level cache, prefetch requests for data of the particular page; and wherein the prefetcher configuration is modifiable by the prefetcher selector to specify that the first prefetcher is not enabled to issue, to the mid-level cache, prefetch requests for data of the particular page and the second prefetcher is not enabled to issue, to the mid-level cache, prefetch requests for data of the particular page.

17. The system of claim 16, wherein the at least one memory access metric comprises a number of times that data of the particular page has been requested.

18. The system of claim 16, further comprising a storage device to provide data to the system memory.

19. The system of claim 16, further comprising one or more of a battery communicatively coupled to the processor, a display communicatively coupled to the processor, or a network interface communicatively coupled to the processor.

* * * * *